(12) United States Patent
Butterworth et al.

(10) Patent No.: US 12,242,899 B2
(45) Date of Patent: Mar. 4, 2025

(54) EVENT PROCESSING IN A DISTRIBUTED COMPUTING ENVIRONMENT

(71) Applicant: Vantiq, Inc., Walnut Creek, CA (US)

(72) Inventors: Paul Butterworth, Alamo, CA (US);
Jacob Schmitz, Oakland, CA (US);
Daphne Nhuch, Tiburon, CA (US)

(73) Assignee: VANTIQ, INC., Walnut Creek, CA (US)

( * ) Notice: Subject to any disclaimer, the term of this patent is extended or adjusted under 35 U.S.C. 154(b) by 0 days.

(21) Appl. No.: 18/492,355

(22) Filed: Oct. 23, 2023

(65) Prior Publication Data
US 2024/0045732 A1 Feb. 8, 2024

Related U.S. Application Data

(63) Continuation of application No. 17/319,873, filed as application No. PCT/US2019/060959 on Nov. 12, 2019, now Pat. No. 11,829,801.
(Continued)

(51) Int. Cl.
*G06F 9/50* (2006.01)
*H04L 45/02* (2022.01)
(Continued)

(52) U.S. Cl.
CPC ............ *G06F 9/5072* (2013.01); *H04L 45/02* (2013.01); *H04L 45/123* (2013.01); *H04L 41/0806* (2013.01); *H04L 67/12* (2013.01)

(58) Field of Classification Search
CPC .................................................. G06F 9/5072
See application file for complete search history.

(56) References Cited

U.S. PATENT DOCUMENTS 5,457,797 A  10/1995  Butterworth et al.
6,021,443 A  2/2000  Bracho et al.
(Continued)

FOREIGN PATENT DOCUMENTS

EP  0926922 A2  6/1999
EP  0926922  11/2011
(Continued)

OTHER PUBLICATIONS

"U.S. Appl. No. 17/319,873, Corrected Notice of Allowability mailed Aug. 18, 2023", 2 pgs.
(Continued)

*Primary Examiner* — Charlie Sun
(74) *Attorney, Agent, or Firm* — SCHWEGMAN LUNDBERG & WOESSNER, P.A.

(57) ABSTRACT

A method distributes event processing in a distributed computing environment by storing transmission costs between computational node pairs, determining a low-cost route to deliver events from producers to consumers based on the costs, applying an augmentation to events via the low-cost route to generate augmented events, and delivering the augmented events to consumers via the low-cost route. Specifically, the method involves storing transmission costs between each of multiple computational node pairs in the distributed environment, where nodes comprise event producers and consumers. A low-cost route is determined to deliver a detected event from a producer to a consumer based on the stored costs. An augmentation is applied to the event via the low-cost route to generate an augmented event. The augmented event is then delivered to the consumer via the same low-cost route.

20 Claims, 20 Drawing Sheets

Related U.S. Application Data

(60) Provisional application No. 62/760,902, filed on Nov. 13, 2018, provisional application No. 62/768,742, filed on Nov. 16, 2018.

(51) Int. Cl.
   *H04L 45/12* (2022.01)
   *H04L 41/0806* (2022.01)
   *H04L 67/12* (2022.01)

(56) References Cited

U.S. PATENT DOCUMENTS

| | | | |
|---|---|---|---|
| 7,549,153 | B2 | 6/2009 | Butterworth et al. |
| 8,424,005 | B2 * | 4/2013 | Strom .................... G06F 9/546 |
| | | | 719/318 |
| 9,258,765 | B1 | 2/2016 | Dacosta |
| 11,614,975 | B2 | 3/2023 | Butterworth et al. |
| 11,829,801 | B2 | 11/2023 | Butterworth et al. |
| 2004/0133656 | A1 | 7/2004 | Butterworth et al. |
| 2005/0216498 | A1 | 9/2005 | Georgalas et al. |
| 2005/0249215 | A1 | 11/2005 | Kelsey et al. |
| 2009/0187635 | A1 | 7/2009 | Lobban et al. |
| 2009/0259769 | A1 | 10/2009 | Lakshmanan et al. |
| 2010/0205187 | A1 | 8/2010 | Bertagna |
| 2015/0334019 | A1 | 11/2015 | Saito et al. |
| 2016/0134539 | A1 | 5/2016 | Hui et al. |
| 2018/0284757 | A1 | 10/2018 | Cella et al. |
| 2019/0165964 | A1 | 5/2019 | Bartier et al. |
| 2021/0271522 | A1 | 9/2021 | Butterworth et al. |
| 2022/0075662 | A1 | 3/2022 | Butterworth et al. |

FOREIGN PATENT DOCUMENTS

| | | |
|---|---|---|
| JP | 2007306442 A | 11/2007 |
| JP | 2007538313 A | 12/2007 |
| JP | 2015095176 A | 5/2015 |
| JP | 2022510569 A | 1/2022 |
| JP | 7483703 | 5/2024 |
| WO | WO-2020102218 A1 | 5/2020 |

OTHER PUBLICATIONS

"U.S. Appl. No. 17/319,873, Non Final Office Action mailed May 10, 2023", 18 pgs.
"U.S. Appl. No. 17/319,873, Notice of Allowance mailed Jul. 17, 2023", 5 pgs.
"U.S. Appl. No. 17/319,873, Response filed Jun. 23, 2023 to Non Final Office Action mailed May 10, 2023", 9 pgs.
"U.S. Appl. No. 17/320,160, Examiner Interview Summary mailed Jul. 5, 2022", 3 pgs.
"U.S. Appl. No. 17/320,160, Final Office Action mailed Oct. 26, 2022", 26 pgs.
"U.S. Appl. No. 17/320,160, Final Office Action mailed Nov. 1, 2021", 11 pgs.
"U.S. Appl. No. 17/320,160, Non Final Office Action mailed May 6, 2022", 22 pgs.
"U.S. Appl. No. 17/320,160, Non Final Office Action mailed Jul. 9, 2021", 10 pgs.
"U.S. Appl. No. 17/320,160, Notice of Allowance mailed Jan. 31, 2023", 8 pgs.
"U.S. Appl. No. 17/320,160, Preliminary Amendment filed Jun. 18, 2021", 6 pgs.
"U.S. Appl. No. 17/320,160, PTO Response to Rule 312 Communication mailed Feb. 17, 2023", 2 pgs.
"U.S. Appl. No. 17/320,160, Response filed Mar. 1, 2022 to Final Office Action mailed Nov. 1, 2021", 13 pgs.
"U.S. Appl. No. 17/320,160, Response filed Oct. 6, 2022 to Non Final Office Action mailed May 6, 2022", 15 pgs.
"U.S. Appl. No. 17/320,160, Response filed Oct. 12, 2021 to Non Final Office Action mailed Jul. 9, 2021", 11 pgs.
"U.S. Appl. No. 17/320,160, Response filed Dec. 15, 2022 to Final Office Action mailed Oct. 26, 2022", 16 pgs.
"European Application Serial No. 19836195.8, Response Filed Apr. 6, 2022 to Response to Communication pursuant to Rules 161(1) and 162 EPC Filed Jun. 25, 2021", 11 pgs.
"International Application Serial No. PCT/US2019/060959, International Preliminary Report on Patentability mailed Mar. 15, 2021", 15 pgs.
"International Application Serial No. PCT/US2019/060959, International Search Report mailed Mar. 13, 2020", 4 pgs.
"International Application Serial No. PCT/US2019/060959, Written Opinion mailed Mar. 13, 2020", 7 pgs.
"Japanese Application Serial No. 2021-526455, Notification of Reasons for Refusal mailed Oct. 3, 2023", with machine English translation, 6 pages.
"European Application Serial No. 19836195.8, Communication Pursuant to Article 94(3) EPC mailed May 27, 2024", 12 pages.
"U.S. Appl. No. 17/319,873, Corrected Notice of Allowability mailed Oct. 26, 2023", 2 pgs.
"Japanese Application Serial No. 2021-526455, Response filed Dec. 27, 2023 to Notification of Reasons for Refusal mailed Oct. 3, 2023", with English claims, 15 pages.
U.S. Appl. No. 17/319,873, filed May 13, 2021, Mesh Agents for Distributed Computing (as amended).
U.S. Appl. No. 17/320,160 U.S. Pat. No. 11,614,975, filed May 13, 2021, Mesh-Based Event Broker for Distributed Computing.

* cited by examiner

EVENT PROCESSING IN A DISTRIBUTED COMPUTING ENVIRONMENT

CROSS-REFERENCE TO RELATED APPLICATIONS

This application is a continuation of U.S. patent application Ser. No. 17/319,873, filed May 13, 2021, which is a U.S. National Stage Application under 35 U.S.C. 371 from International Application Serial No. PCT/US2019/060959, filed Nov. 12, 2019, and published as WO 2020/102218 on May 22, 2020, which claims the benefit of the filing date of U.S. Application Ser. No. 62/760,902, filed on Nov. 13, 2018 and the benefit of the filing date of U.S. Application Ser. No. 62/768,742, filed on Nov. 16, 2018, the disclosures of which are hereby incorporated by reference in their entireties.

BACKGROUND

Real-time, event-driven applications are taking center stage as the next generation of business applications, supporting the transition of businesses to become digital businesses. Next generation planning, operations and customer engagement applications that provide optimal, personalized experiences depend on real-time sensing and near real-time decision making. Such applications must be built on a modern, event-driven application platform.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Glossary

Figure 1:
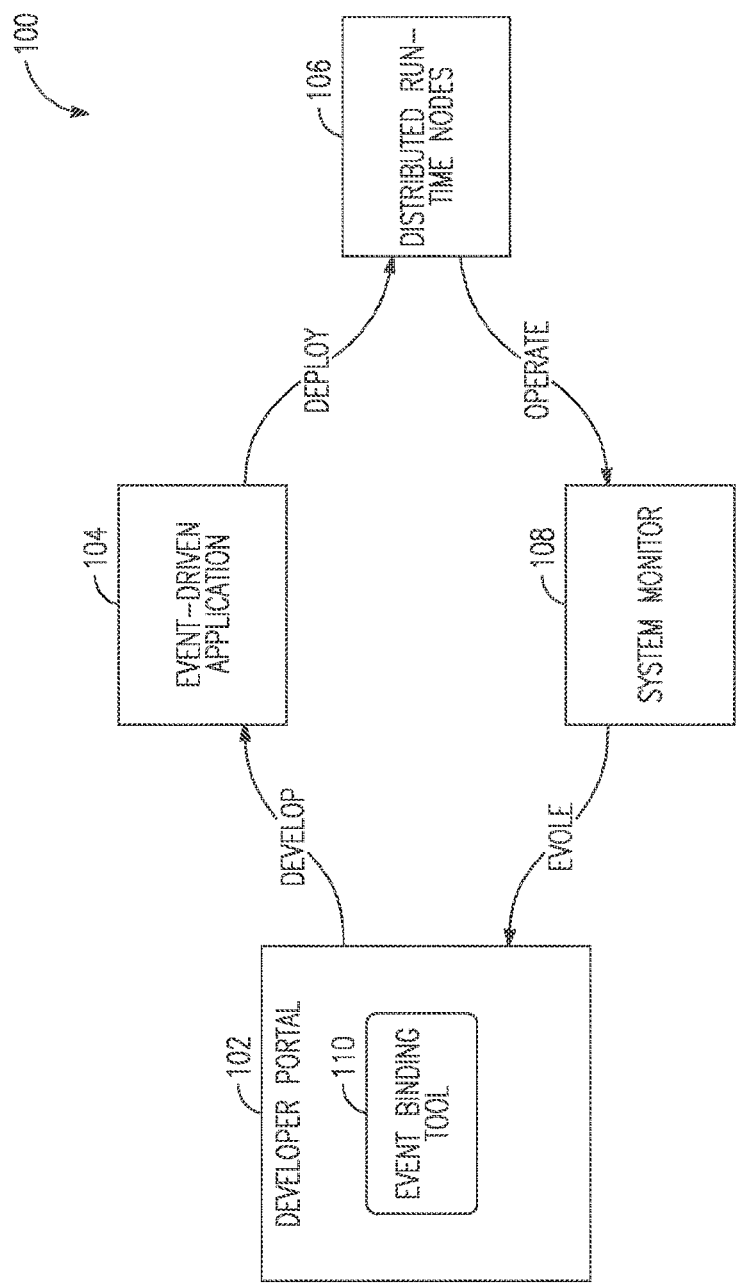
FIG. 1 illustrates a Platform-as-a-Service (PaaS) 100 in accordance with one embodiment.

"Carrier Signal" in this context refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface.

"Communication Network" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion/component) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-Readable Medium" in this context refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine-Storage Medium" in this context refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Signal Medium" in this context refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"Mesh Network" in this context refers to a network topology for a distributed computing environment in which the computational nodes connect, for example, directly, dynamically and non-hierarchically to as many other nodes as possible. The nodes may then cooperate to route network traffic from its source to its destination. Mesh networks may self-organize and self-configure dynamically. Mesh networks in which each node connects to all other peer nodes is known as a full mesh network. Mesh networks in which each node connects to a large but potentially selective set of peer nodes is known as a partial mesh.

DESCRIPTION

Partitioning

The term "application partitioning" refers to the process of developing applications that distribute the application logic among two or more computers in a network. In the simplest case, the application can run on a single PC, as a remote service, and send task requests for execution to a server. In more advanced cases, the application logic can be distributed among several servers.

Current application partitioning systems focus portioning of object-oriented applications distributed across a local area network. Such partitioning systems depend on users to identify specific object instances that are then manually placed on specific computational nodes. With the manual assignments in place, a partitioning system proceeds to allocate the remaining components to the partitions without consideration for the manual assignments and then binds the objects representing each node for access over the distributed Technology and mechanisms, according to some example embodiments, to partition event-based applications are described herein. Specifically, a Platform-as-a-Service (PaaS) 100 is described, which includes a deployment manager that operates to identify node sets within a distributed computing environment, and then use the identification of events, in event-based applications, to perform automated partitioning of such event-based applications. To this end, the deployment manager, and more specifically a partitioning system that forms part of the deployment manager, analyzes the source code of the event driven-application to infer relationships between components of the event-driven application. The partitioning system then applies a knowledge base of known relationships, via a rules system (e.g., assignment rules) to perform partitioning activity. The partitioning system then outputs configurations, reflecting the automated partitioning, as one or more configuration files.

The described embodiments provide a number of technical advantages over known solutions, in that the described embodiments do not require the a priori creation of object instances to drive the partitioning activity. Further, the described embodiments optimize the placement of components, whereas many current solutions operate to place all executable code on all computational nodes within a computing environment. Further, the described embodiments do not bind objects together because objects are simply not required, and bindings are dynamic as a function of the architectures of the event-based applications.

Event Broker

An event-driven architecture (EDA) is a software architecture based on the production, detection, consumption, and reaction to events. An event may be regarded as a change of state from a technical perspective, and responsive to which an event notification is produced. An event notification is a notification of the state change that triggered the event notification transmission. An EDA may be implemented by applications and systems that transmit event notifications between loosely coupled software components and services. An EDA may include event transmitters, event consumers, and event channels. Some EDAs may employ event brokers, which are used as centralized mediators to acquire and deliver events. A mediator may be a process residing on a single logical node within a distributed computing environment. Event notifications (or messages) are sent to the mediator, augmented and then delivered to an event consumer (e.g., an event subscriber) via the mediator. This approach is based on legacy architectures, first introduced with message brokers and later adopted by event brokers.

According to some example embodiments, there is provided a mesh event broker, which distributes acquisition, augmentation and delivery of events across distributed nodes participating in one or more event ecosystems, such distributed nodes including event publishers, event subscribers and intermediaries. The mesh event broker, in some embodiments, seeks to eliminate a mediator as a single point of failure, distributed workload to simplify and extend scaling, and provide interconnection between event publishers and event subscribers within different networks.

According to some example embodiments, a collection of cooperating agents operates as a "mediator," and form a mesh network supporting direct point-to-point communication. Each cooperating agent is provisioned to support augmentation, and to provide delivery of a specific set of publishers and subscribers to events published by supported publishers. Similarly, subscribers may be provisioned to augment and deliver events for which they are local subscribers. In addition, the cooperating agents, as a mesh, can forward messages across the mesh to improve event transmission efficiency, and to bridge between agents that are configured on different networks.

Event-Driven Applications

According to some example embodiments, event-driven applications may be deployed in a distributed manner for improved responsiveness, robustness, and security. As described herein, an event-driven application may be developed in a single cloud location and then automatically partitioned, resulting in the components of the application being distributed to the most optimal nodes for execution whether the nodes are cloud hosted, data center hosted, intelligent devices at the edge, or a combination thereof. Logic is located where it is the most effective. A wide range of system topologies including star, hierarchical, and peer-to-peer are supported. The provisioning and management of these networks are made automatic and managed by intelligent features of the Platform-as-a-Service (PaaS) 100 described herein. Application components can be dynamically changed anywhere in a distributed environment for one or tens of thousands of nodes while the system is running.

Described example embodiments also seek to automate the design, provisioning, and management of real-time, event-driven applications so that the development of the systems can focus on the business logic and not necessarily the underlying infrastructure. To this end, the Platform-asa-Service (PaaS) 100 provides capabilities and integrations that seek to improve the speed and efficiency with which event-driven business applications can be constructed, deployed and operated.

An event-driven application, according to some example embodiments, may incorporate the following flow:

Input is received from a number of sensors, for example over an extended period of time. Sensors may be, for example, physical sensors, data streams produced by other enterprise systems or public data streams.

The sensor data is analyzed to produce the events, consisting of information and context, on which automation, recommendation and collaboration decisions are made. Additional context may be extracted from other systems to augment the sensor data The events are evaluated in real time to determine the actions that need to be taken. For example, discrete rules and/or. machine learning strategies may be used to perform the real-time evaluation.

Actions are transmitted to the responsible systems for implementation, or human-machine collaboration is initiated with responsible personnel to determine the most appropriate response to the current situation.

In real-time event-driven business applications, processing may be performed local to the device under control, improving response time and reliability. For example, in an industrial setting, managing the position of a materials handling system requires near real-time responses within a few hundred milliseconds. Such response times cannot be guaranteed by a remote decision-making system that may be delayed by thousands of milliseconds if there is a network problem. Processing is done in a secure environment that carefully manages access to situational data and the ability to initiate control actions.

At a high-level, an event-driven application, as described herein, may operate to perform operations including data acquisition, situational analysis and response action responsive to a detected situation.

Dealing firstly with data acquisition or sensing, an event-driven application may receive data from any one of a number of sensors. Sensors may include, for example:

Mobile devices hosting sensor data including location, acceleration, audio, video and behavioral patterns derived from the raw sensor data.

Wearable devices such as watches, activity trackers, health monitors, audio and video headsets.

Machines including industrial machines, land and airborne transportation, home appliances and any mechanical or electronic equipment that can be sensed and/or controlled. For example, imagine a robot's manipulators instrumented with pressure sensors to vary the pressure applied to objects that may have different crush points.

Stand-alone sensors deployed in great numbers. For example, moisture sensors distributed across the fields of a farm to minimize water consumption while maximizing growth rates for the crops Video and audio feeds that produce high volumes of what can be considered sensor data. Recognition software is used to determine what the video represents to translate the video into more discrete events on which automation decisions can depend.

Existing enterprise applications producing streams of transactions.

Such sensors can be connected directly to the Internet with their own IP communications stack or may be indirectly connected to the Internet via an edge node. In the latter case, the sensors themselves may communicate over more specialized protocols such as Modbus or ZigBee with the edge node providing protocol conversion so that the sensors appear as virtual nodes participating in the IoT.

Turning now to situational analysis, once data has been acquired, a real-time, event-driven application may be responsible for analyzing the data, and producing events or situations that represent business or technical conditions that require a response. An event-driven application may then initiate an automatic response to the current state of the machine or customer, and/or a collaboration between the appropriate operations personnel and the system, to produce the optimal response.

Events and situations may be detected by analyzing the data streams and their context using rules, statistical methods, and machine learning. Examples of events or situations that may be detected during analysis include, merely for example:

Equipment that is not performing to expectations with conditions such as high temperature or low speed.

Customers that have arrived at an interesting location in a store or facility. For example, they are standing at a checkout kiosk or a specific merchandise display.

A user is in an unsafe area and needs help.

The distribution of orders has changed requiring the attention of product management.

Once a situation is detected, a response to the situation may be generated by an event-driven application. The response may be a response initiated autonomously by the automation system or a response determined via collaboration among the automation system and the responsible individuals. Responses may include:

Providing relevant responses to consumers based on their current situation (e.g., items on sale, facility map, emergency response recommendations).

Respond intelligently to exceptional conditions (e.g., close a valve, turn on sprinklers, stop a malfunctioning robot).

Proactively alert personnel to opportunities/problems based on the current situation (e.g., extra delivery trucks available, shortage in part of the supply chain).

Optimize the user or business resources to improve productivity and/or customer satisfaction (e.g., speed up an assembly line, advise sports attendees on the shortest path to their car).

In response to a situation, an automated response may be taken directly by the real-time, event-driven business application or may be forwarded to a more specialized system for implementation. For example, an action to shut down a machine may be forwarded to the control system that directly manages the machine rather than having the application directly send a shutdown command to it.

For situations where the optimal response may be somewhat ambiguous or where determining the optimal response is beyond the capabilities of the system, a collaboration activity involving the system and the responsible individuals develops the optimal response. For example, the sensor readings may indicate there is a potential problem with a machine but not provide enough information to automatically decide to shut it down. Instead, the operations team collaborates with the system to review the current data and obtain further information, for example via a visual inspection of the machine, to determine if the situation warrants a shutdown of the equipment.

Some cases in which collaboration can produce optimal outcomes:

Exception situations for which the data streams are inadequate to uniquely define the root cause and determine the best course of action.

Situations in which the operations team is privy to additional information not available to the system.

Situations in which a manual action must be taken on the part of a system that is not controllable online.

Situations in which policies or regulations demand more in-depth analysis of the situation before an action can be taken.

Another important class of collaborations notifies interested parties of actions taken and the resulting new state of the system. Notifications can be delivered to other automated systems so that they can independently respond to the situation, or delivered to responsible staff via desktop PCs, mobile devices, and wearable devices. Notifications can also include recommended actions and situational awareness of pending problems.

Real-time, event-driven business applications may be distributed. In manufacturing environments, for example, Programmable Logic Controllers (PLCs) communicate with area controllers and edge nodes that forward the data to more centralized IT systems. In consumer environments, data may be collected from numerous position sensors, processed locally into logical locations on which immediate automation decisions are made and forwarded to remote systems that optimize the experience for the consumer. Such a wide variety of distributed applications require support for an equally broad set of distributed topologies ranging from devices directly reporting to a central site, to hierarchically structured automation systems, to federated peers collaborating to improve a collection of organizations or businesses.

Simple architectures are sensors reporting to a central site. For example, a system collecting sensor data from a mobile phone and reporting that data to a cloud service represents an example of a centralized architecture.

More sophisticated architectures contain additional levels of processing and connectivity. Hierarchical systems are more complex and mimic many existing physical and organizational structures. For example, an industrial IoT system that consists of sensors reporting to local controllers that report to plant-wide controllers that report to divisional headquarters that report to corporate headquarters represents a tree topology. These systems provide both centralized and decentralized monitoring and control. Such systems are more responsive in real-time or near real-time situations. For example, it may be sub-optimal to control factory equipment in real time by collecting the data, transmitting the data to corporate HQ and having corporate HQ systems determine the next action for the machine. It may be more effective to do such an analysis on the local controller and simply report the situation and the action taken to the plant-wide controllers and, subsequently, to regional and corporate HQ. Faster response times, improved availability and local control make the distribution of the situational evaluation, collaborative decision making and response processing across the hierarchical topology more efficient than moving everything to HQ and making all decisions in a centralized fashion.

Another example of hierarchical real-time, event-driven business applications is the use of edge nodes to act as local processors for a collection of sensors and control points with the edge nodes then interacting with more centralized systems.

Examples of sophisticated distributed real-time, event-driven business applications are peer-to-peer systems, where peers are managed by separate organizations. For example, in an electrical demand-response system, the overall system consists of sensors managed by power utilities and sensors managed by utility customers while control of the system is distributed across the utility and its customers. To provide real-time demand-response, the utility system and the customer systems must collaborate. This is accomplished by each system making local decisions and transmitting both the local situation and the local decisions to the other party and then agreeing to modify their real-time behavior based on feedback from each other.

Platform-as-a-Service (PaaS)

FIG. 1 is a block diagram illustrating the high-level functionality of a Platform-as-a-Service (PaaS) 100, within which example embodiments of the described technology may be deployed. The Platform-as-a-Service (PaaS) 100 is designed and architected to support development, deployment, and operation of real time business applications. Specifically, the Platform-as-a-Service (PaaS) 100 includes a developer portal 102, using which developers develop event-driven application 104, which are then deployed to distributed run-time nodes 106. A system monitor 108 monitors operations of the event-driven application 104 on the distributed run-time nodes 106 and provides feedback to the developer portal 102 so as to enable a developer to evolve the event-driven application 104.

The event-driven application 104 may be event-driven (e.g., act instantly on an event rather than storing data and performing the latest status checks). The Platform-as-a-Service (PaaS) 100 may furthermore be implemented on a Reactive framework, so as to support the real time functionality by providing an asynchronous and non-blocking platform. Event streams in a highly distributed and large-scale environment (e.g., when receiving events from an Internet-of-Things (IoT) environment) provide technical motivation for a move away from a traditional three-tier architecture, to an event-based model.

The Platform-as-a-Service (PaaS) 100 further supports the design and runtime of event-driven application 104 serving up large numbers of events. To this end, the Platform-as-a-Service (PaaS) 100 enables a topology of a massive number of distributed run-time nodes 106 in a distributed environment. The distributed run-time nodes 106 may be peered horizontally in order to provide additional processing power. Where the volume of data collected (or events generated) exceeds limits for upload to a central processor, or with low latency is required, the distributed run-time nodes 106 may be arranged in a tree-structure in order to migrate processing close to the data at the edge of the topology.

Further, the distributed run-time nodes 106 may be clustered horizontally to ensure mission-critical availability.

While the event-driven application 104 provides the benefits of an event-based architecture, and Reactive programming, the developer portal 102 may require only an understanding of JavaScript and SQL through the provision of "low-code" development tools. The development tools support the visual declaration of components where productive, as well as high-level scripting for more complex elements of the event-driven application 104 not suited for visual development. Specifically, the developer portal 102 may provide visual editors for rules, types, sources, collaborations, topics and configurations; scripting editors for rules and procedures; and a domain-specific language (DSL) based on SQL and JavaScript to leverage existing skills. In addition, the developer portal 102 provides testing capabilities through a rule and procedure debugger, tracing and logging facilities, real-time subscription support and data visualization, synthetic data generators, and incremental deployment. Further, the developer portal 102 supports deployment through a distributed configuration (e.g., cloud, private cloud, on-premise, hybrid, and edge), and a visual deployment tool.

Event-Driven Application

Figure 2:
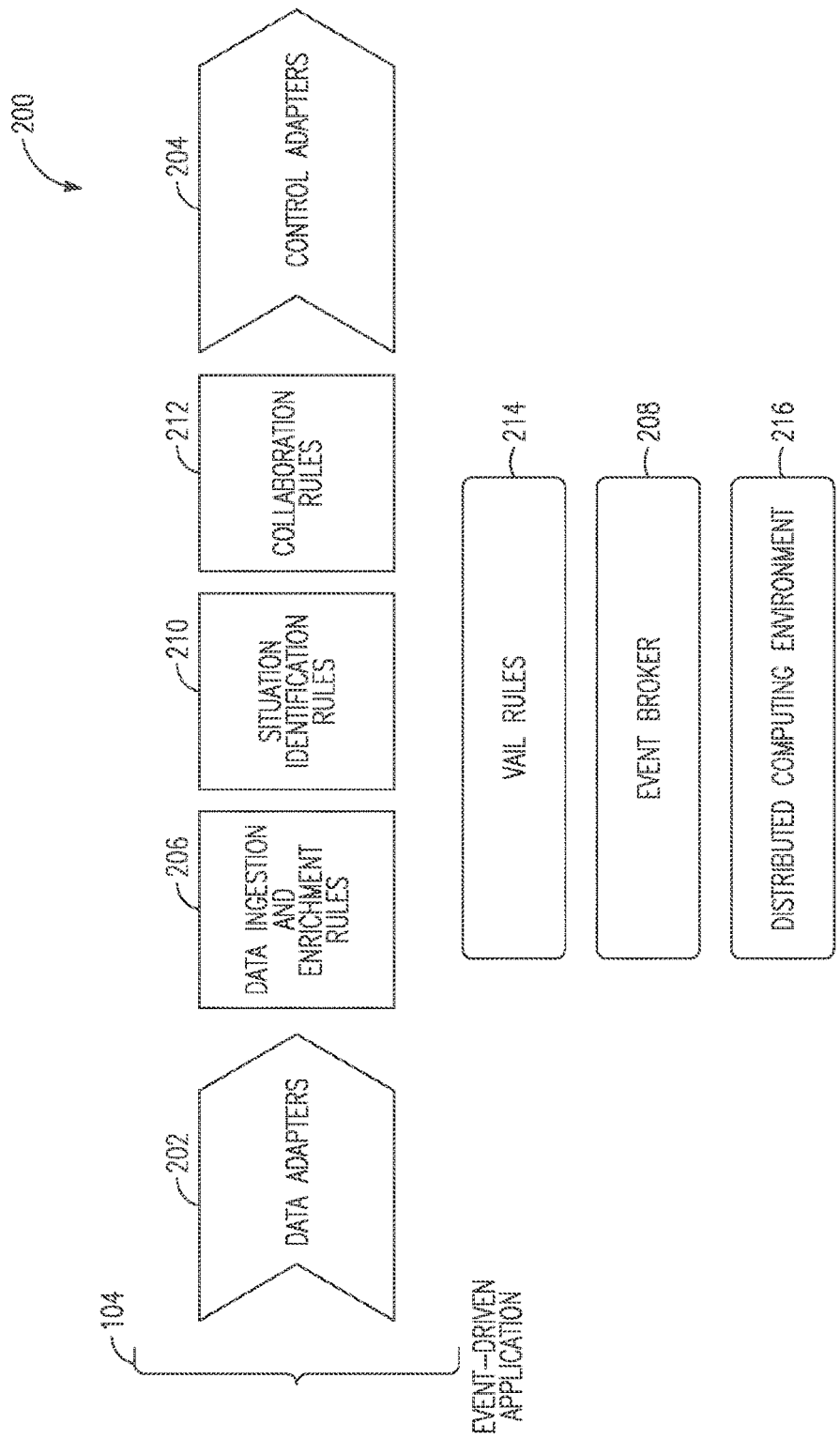
FIG. 2 illustrates an architecture 200 in accordance with one embodiment.

FIG. 2 is a block diagram, illustrating further details regarding an architecture 200 of an event-driven application 104 of the Platform-as-a-Service (PaaS) 100, according to some example embodiments.

The Platform-as-a-Service (PaaS) 100 provides a platform support developing, deploying and operating high performance, distributed real-time, event-driven business applications (e.g., the event-driven application 104) consisting of:

1. Data Acquisition: Technologies for obtaining data from IoT and enterprise sources, filtering the data and making it available to an automation decision engine.
2. Event and Situational Analysis: A decision engine for analyzing the data in real-time and making decisions based on the results.
3. Action: Technologies for sending control information to devices and for notifying external systems and users of the decisions or recommendations for subsequent actions being made by the automation solution. Technologies for managing collaboration between the automation system and the responsible individuals to develop optimal responses to complex situations.

To this end, FIG. 2 shows that the event-driven application 104 includes several adapters, including data adapters 202 and control adapters 204. The event-driven application 104 also includes a number of rules, specifically data ingestion and enrichment rules 206, situation identification rules 210. and collaboration rules 212.

The data ingestion and enrichment rules 206 are responsible for the ingesting and enrichment of data received by the data adapters 202. The data adapters 202 and the data ingestion and enrichment rules 206 form part of a data acquisition subsystem and enable integration with several enterprise systems, public data sources social data sources (e.g., messaging systems, or any system with a REST interface). The data ingestion and enrichment rules 206 are responsible for the ingesting and enrichment of data received by the data adapters 202.

Broadly, the data acquisition subsystem acquires data from a wide array of data sources by using standard protocols such as, for example, REST, MQTT, and AMQP. The data sources may include, for example, IoT devices and enterprise systems that hold context required to evaluate the data flowing from sensors and placing the sensor data in the proper context. For example, if an event-driven application is assisting a customer by tracking their location, access to information in a Customer Resource Management (CRM) system may be required to obtain the customer's profile information and to assess the opportunities to assist the user at their current location. This places a heavy emphasis on the integration of existing systems as part of the application. The Platform-as-a-Service (PaaS) 100 supplies a wide range of declarative integrations to facilitate the incorporation of existing enterprise systems into the real-time, event-driven business application.

The Platform-as-a-Service (PaaS) 100 may support:
Both push and pull models
Synchronous and asynchronous models
RPC (Remote Procedure Call), as well as store and forward messaging systems The source may elect to send data by matching documented specified formats or can choose to have the 100 accept the native source format and use a filtering system to convert it to the proper format for internal processing.

With these capabilities, the data acquisition subsystem makes source integration simple by matching the interaction model and message protocols of the source, rather than requiring the source to match messaging models of the Platform-as-a-Service (PaaS) 100.

Further, the Platform-as-a-Service (PaaS) 100 supports a model for managing data hosted behind firewalls that do not allow external systems to communicate directly with the data sources.

The flexible nature of the data acquisition subsystem allows such sources to provide data at their discretion rather than requiring the source to respond to an external request that cannot be delivered through the firewall.

Security may be maintained by requiring the Platform-as-a-Service (PaaS) 100 to use user-supplied credentials to access data in peer nodes. Thus, every node has complete control in determining which peer nodes are authorized to access the local node.

Event and situational identification and analysis is performed by the situation identification rules 210. Specifically, the situation identification rules 210 may process streaming data in both simple and complex configurations:

Data from multiple streams can be correlated to assist in situational analysis. The developer uses a simple domain-specific language derived from SQL to specify that an event detected in one stream must come before or after an event in another stream, or both events must happen within a specific timeframe with the events occurring in either order. Even in cases where events do not occur, a common error indicator can be specified in a simple fashion. Event constraints can be composed to any level making the specification of complex conditions simple. For example, an automation system may monitor two sensor streams for a mechanical device with the first stream reporting speed and the second reporting position. If the automation system sends a stop request to the device, it expects to see the speed of the device as read by the first sensor go to zero and the position of the device to remain unchanged once a speed reading of zero has been seen. If the position changes AFTER a speed of zero has been reported an alert is generated. Also, if a position is NOT reported within 30 seconds of a speed of zero being reported an alert is generated indicating a potential failure of the device control system.

Some of the streaming data is processed immediately or held only for a short time to facilitate time-series construction while other data may represent an extended time series or historical data that must be maintained over longer periods of time. The 100 simplifies the use of both transient and persistent data by unifying the abstractions used to represent series and set data in both its transient and persistent form.

Data is analyzed by discrete collections of rules or by algorithms produced by machine learning systems and subsequently integrated into the application.

A complete set of services is available to forward data to other nodes in a distributed topology using the SQL-based domain specific language to easily support real-time processing throughout the distributed environment.

Automation and collaboration are supported by the control adapters 204 and the collaboration rules 212.

The collaboration rules 212 are used to implement human-machine collaboration, between a human user and components of the Platform-as-a-Service (PaaS) 100. The collaboration rules 212 seek to enable human users and machines within the Platform-as-a-Service (PaaS) 100 to work as independently or collaboratively as possible, depending on the situation, and to adjust to each other's requirements (e.g., the human user drives operations, while the system reacts, or system drives operations, while the user reacts).

Actions may be applied directly to the internal state of a system. Actions may be applied to external devices using source integrations (e.g., the control adapters 204) that deliver the actions to external devices or edge nodes using standard integrations such as REST, MQTT, AMQP and others, or custom integrations.

The Platform-as-a-Service (PaaS) 100 provides a model for creating actions or responses that involve collaborations between the application and its users. The collaboration model supports development of collaborations by composing high level collaboration patterns using a graphical editor of the developer portal 102. For example, the collaboration rules 212 may support a number of collaboration patterns including:

Notification—handle notifications and responses via SMS, EMAIL, push notifications and messaging systems.

Assignment—negotiate assignments of users to tasks.

Location Tracking—significantly simplifies the task of knowing when a user reaches a specified destination, as well as their current location during their travels toward their destination.

Conversation—mediate a conversation among users over third party messaging systems.

Escalation—respond to critical delays in completing tasks.

The Platform-as-a-Service (PaaS) 100 also supports mobile clients that can be used to easily integrate people into the overall collaborative decision-making process. The clients are designed to support natural and efficient interactions. Users are automatically notified of situations that need their attention, and custom interfaces for each notification supply the user with needed information. The user can respond by using data capture features of the mobile device—videos, photos, audio, location, acceleration, voice with natural language recognition, as well as traditional text entry.

While many systems force the distributed nature of an application to be explicitly programmed, configured and deployed, the Platform-as-a-Service (PaaS) 100 simplifies these operations by separating a logical definition of the application from its physical deployment. Using the developer portal 102, developers may define applications as if they are to run on a single system, while application components are automatically provisioned to nodes using vail rules 214. At runtime, the distributed run-time nodes 106 of the Platform-as-a-Service (PaaS) 100 operate together to act as a single real-time business application in a distributed computing environment 216, with events related to that application being processed by an event broker 208.

Topologies

The Platform-as-a-Service (PaaS) 100 supports a general model of distributed and federated topologies. A distributed application (e.g., event-driven application 104) may consist of two or more nodes. with each node representing an installation. An installation can contain a single service instance or a cluster of service instances. Installations are assembled into a distributed topology when an installation declares at least one "peer" node with which it desires to exchange messages.

Installations, by default, are considered independently managed. A node, A, declaring another node, B, as a peer must have credentials to access node B. Thus, the Platform-as-a-Service (PaaS) 100 is naturally federated since a node may only exchange messages with another node if it has been granted sufficient rights to perform the desired operation on the peer node. Peering is symmetric. If node B wishes to exchange messages with Node A, Node B must provision Node A as a peer and have sufficient rights to access node A.

Since the peering relationships can be defined between any two nodes, the Platform-as-a-Service (PaaS) 100 can support any distributed topology. Also, the topologies are implicitly federated since authentication and authorization are independently managed at each node.

Certain usage patterns may require (or favor) topologies in which all nodes in the distributed system are managed by a single authority. Such systems may be organized into star and tree topologies:

Star—consists of a single parent node with an arbitrary number of child nodes.

Tree—consists of a root node with an arbitrary number of child nodes where each child node may act as a parent for an arbitrary number of child nodes.

As the deployed system becomes more collaborative, more general federated peer-to-peer networks may be constructed. In such a network topology, any node may peer with any other node leading to a general graph structure representing the connections among the nodes. The network model tends to be the most complex since cycles in the graph are possible and the cycles must be handled by any functions that operate on more than one node in the graph.

Also, because each node represents an independent system that may require separate credentials, the Platform-as-a-Service (PaaS) 100 naturally generalize to federations among collaborating organizations.

Deployment

Figure 3:
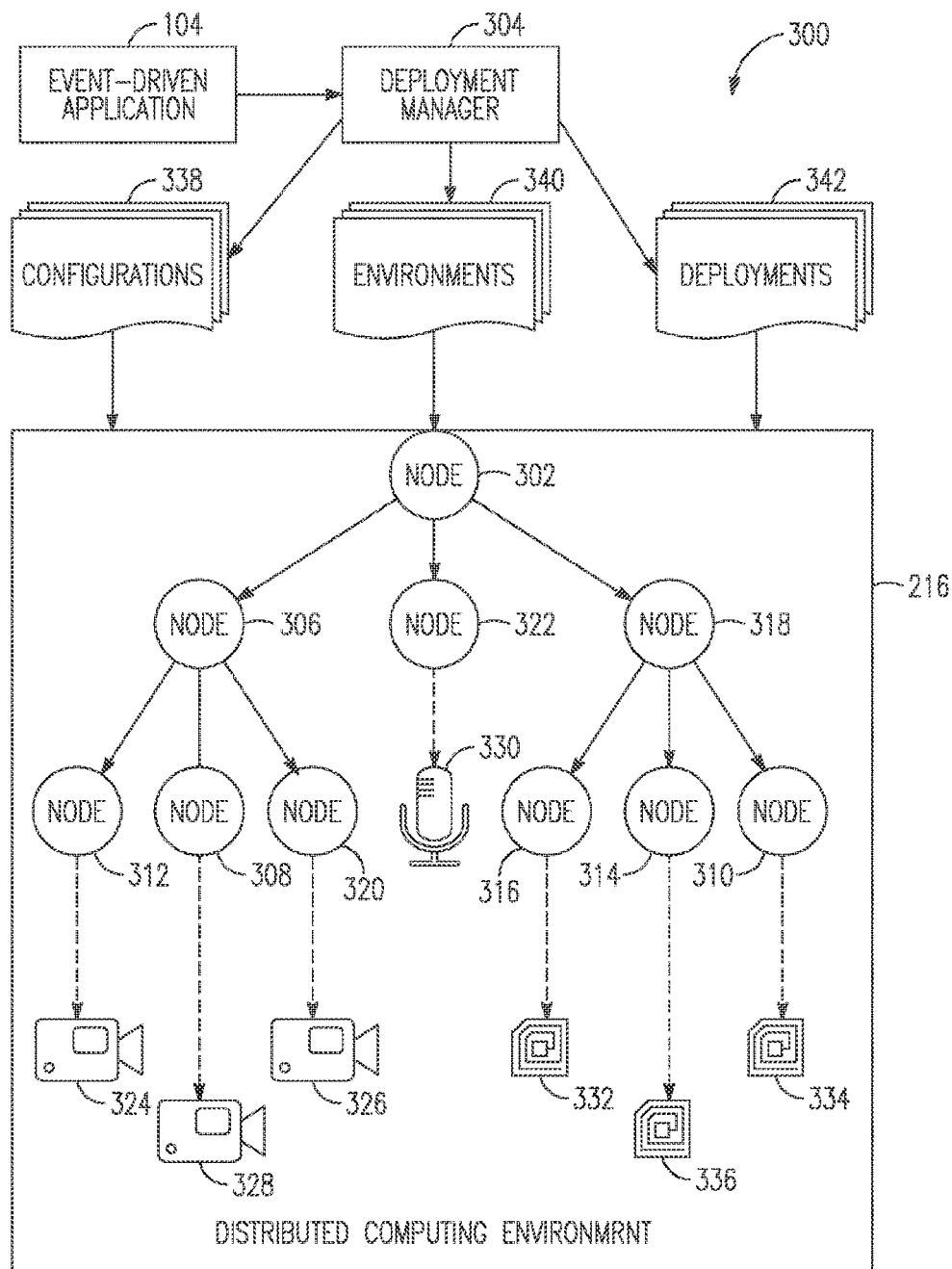
FIG. 3 illustrates a deployment 300 in accordance with one embodiment.

FIG. 3 is a diagrammatic representation showing a deployment 300, according to one example embodiment, of an event-driven application 104. Specifically, the Platform-as-a-Service (PaaS) 100 includes a deployment manager 304, which operationally manages of the deployment of an event-driven application 104 to a target environment, such as the distributed computing environment 216. FIG. 3 illustrates the distributed computing environment 216 as consisting of a number of nodes that are reachable, either directly or indirectly from a node on which the deployment manager 304 is running. The physical nodes in the distributed computing environment 216 may be organized into node sets, where a node is a member of a particular node set based on having descriptive properties that satisfy criteria established for the node set.

Each node within the distributed computing environment 216 may be a computational resource associated with a particular device or component. The network of nodes within the distributed computing environment 216 may thus be used to implement an Internet of Things (IoT), in which case of the event-driven application 104 may comprise an IoT application. For example, FIG. 3 shows that node 312, node 308 and node 320 (which may constitute a particular set of nodes or a partition) each associated with a respective camera 324, camera 328 and camera 326. Similarly, node 316, node 314 and node 310, which again may constitute a particular partition together with a node 318, are associated with a respective RFID tag 332, RFID tag 336, and RFID tag 334.

The deployment manager 304 deploys configurations 338 of components (or artifacts) of an event-driven application 104 to specific nodes or node sets. A single configuration contains a manifest of components to deploy to a single node set. Each of the configurations 338 may define a corresponding partition, and a set of project artifacts (including components of an event-driven application 104) to be deployed to a specific partition. In one example, a partition logically represents a set of nodes onto which the project artifacts identified in a specific configuration will be deployed. A partition is defined by a constraint of a configuration on the attributes of the qualifying nodes, selected from the set of nodes within a target environment (e.g., the distributed computing environment 216.) Configurations 338 may be contained within one or more projects (as described below with reference to FIG. 4). A set of configurations 338 are defined within each respective project and define the set of partitions to which the artifacts of the project are to be deployed.

The deployment manager 304 is also used to define environments 340, with each environment consisting of a list of nodes contained within a particular environment (e.g., the node 302-node 322 within the distributed computing environment 216). When a project is deployed by the deployment manager 304 to an environment, each node in the environment is allocated to one or more partitions (e.g., a logical set of nodes). The project artifacts assigned to each partition are then deployed onto the nodes that are qualified members of the corresponding partition. It should also be noted that a set of nodes assigned to an environment (e.g., the distributed computing environment 216) may be a subset of the nodes defined within a namespace in which the deployment manager 304 is executing.

FIG. 3 also shows the deployment manager 304 as being associated with deployments 342. Each of the deployments 342 defines a binding between a project and an environment defined in that project. A deployment action takes a particular deployment of the deployments 342 as its argument and deploys the associated project into the environment.

Deployment parameters may be used to customize project artifacts for deployment in a particular environment. For example, each parameter may identify an artifact, and a property of that artifact. During deployment, the value associated with the parameter replaces the default value of that property in the definition of the relevant artifact.

Deployment Manager

Figure 4:
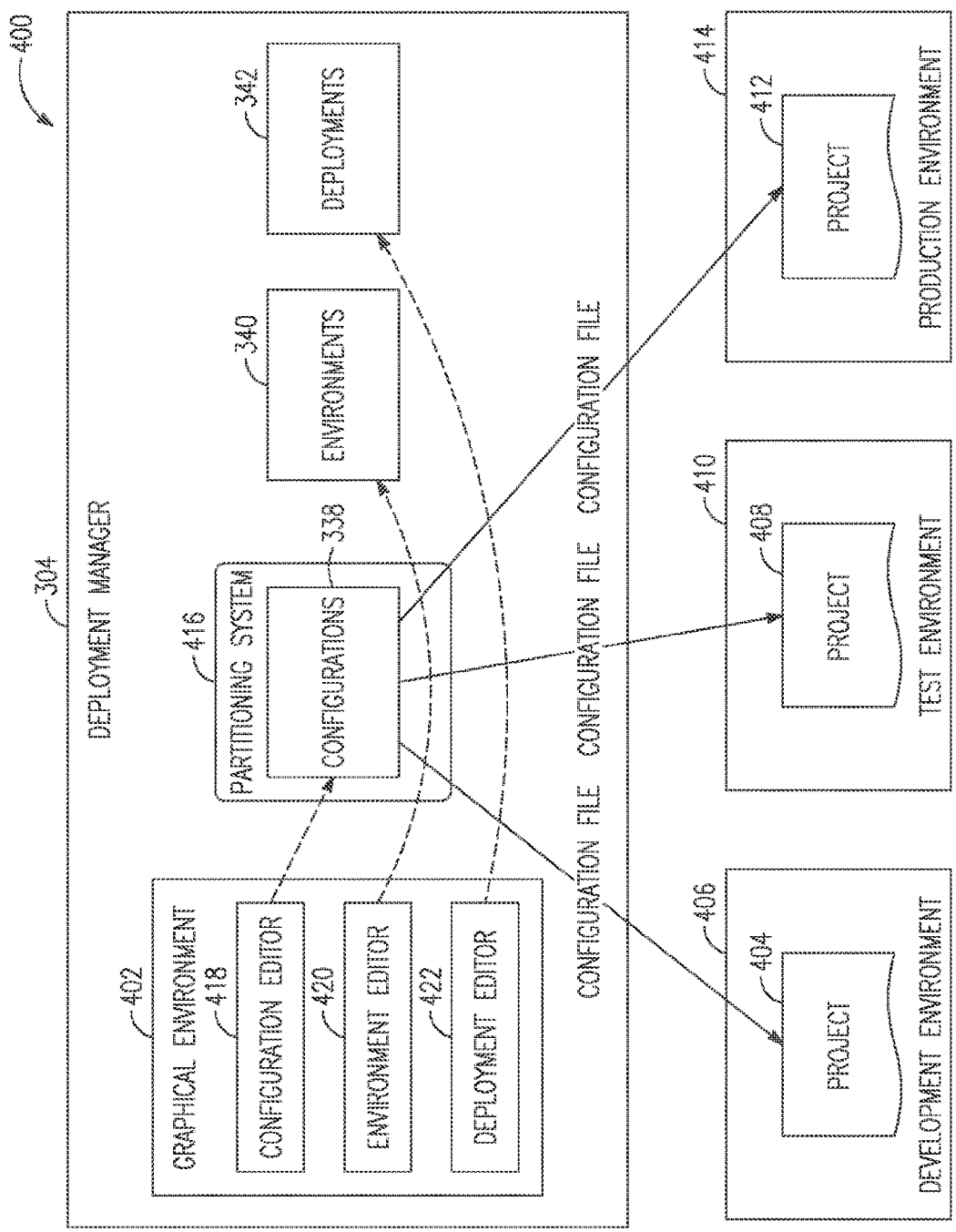
FIG. 4 illustrates a deployment environment 400 in accordance with one embodiment.

FIG. 4 is a block diagram showing further details of a deployment environment 400, according to some example embodiments. The deployment environment 400 includes a deployment manager 304, which operates to simplify development tasks for a developer, by focusing on the deployment of projects (e.g., project 404, project 408 and project 412).

The deployment manager 304 performs a number of functions, including:

Automatically creation of default partitions and the assignment of development artifacts to each partition.
Automatically assignment of partitions to nodes defined in target environments 340.
Enabling the user to customize configurations 338, environments 340 and deployments 342.
Deploy projects and visualize the status of the deployment activities.
Via the CLI, make the deployment activities available to scripting and automation tools The deployment manager 304 presents a developer with a graphical environment 402, in which the developer can manage the configurations 338, environments 340 (e.g., a data structure that defines a target environment in which to manage configurations), environments 340 (e.g., a data structure that defines a target environment in which configurations 338 of a project are deployed), and deployments 342 (e.g., a data structure that defines a binding between configurations 338 and environments 340 of a project, as well as deployment activities). A particular project (e.g., project 404) may be deployed to more than one environment (e.g., development environment 406, test environment 410, and production environment 414), thus satisfying a need to deploy to multiple such environment types.

Further details are now provided regarding each of configurations 338, environments 340, and deployments 342.

Configurations

The configurations 338 contain the manifest of artifacts that are part of the configuration and the definition of the partition to which they are deployed. A configuration may define a single partition and the artifacts assigned to the partition. A project may contain one or more configurations with each configuration describing the artifacts deployed to a unique partition. An artifact may be a member of more than one configuration. A configuration may also contain other configurations in its manifest. In such cases, the child configuration may be deployed to the partition and then subsequently the child configuration is deployed using the deployment manager on the nodes assigned to the target partition.

Configurations 338 may contain only artifacts that are members of the containing project.

Artifacts that are included in configurations 338 and placed in partitions include:
Rule
Source
Type
Procedure
Topic
Visual rule
Configuration
Client
RCS request
RCS payload
Collaboration type Applications and collaborations are included in configurations 338 but are not partitioned because they are comprised of more primitive, partitionable rules and procedures.

Environments

Each of the environments 340 enumerates a set of nodes that are members of the environment. The nodes may be members of the project in which the environment is defined.\
environments 340 describe project independent computing topologies, making it possible to deploy multiple projects to a single environment. Nodes in an environment definition are not required to be assigned to a partition, further improving the reusability of environments 340 across multiple configurations and projects.

Deployments

A deployment identifies a binding between a development project and an environment, with the intention of deploying the project to the environment. The result of a deployment operation applied to a deployment is the artifacts in the project's configurations deployed onto the nodes defined in the environment.

Deployment parameters make projects and their configurations portable across environments. A deployment parameter identifies an artifact, a property of that artifact and a value assigned to the property. At deployment time, each deployment parameter value is substituted into the identified artifact property replacing the default value that was originally configured for the artifact. This allows the artifacts to be bound to physical resources that may be unique to each environment.

Projects

Turning specifically to projects (e.g., project 404, project 408, or project 412), each project contains a subset of artifacts that are defined within a namespace. As such, a project represents a deployable unit of functionality, which may informally be denoted as an application or a service. Regarding distinctions between applications and services, an application may operatively accept an inbound event stream, regardless of whether such an event stream is produced by an external system (e.g., an MQTT queue) or produced by a user via a user interface. Services, on the other hand, respond to invocation requests delivered via a REST interface, or by being invoked directly by a script. Services may be considered "micro-services," as they are independently deployed and transparently managed. As shown in FIG. 4, projects are also a unit of deployment, with the result of the deployment being an active application or service that executes in response to inbound requests.

Graphical Environment

As noted above, the deployment manager 304 presents developers with a graphical environment 402 (or visual editor) for visualizing and editing configurations 338 (using a configuration editor 418 component), environments 340 (using an environment editor 420 component), and deployments 342 (using a deployment editor 422 component).

The configuration editor 418 visually displays configurations 338/partitions in a drawing panel with a rectangular area representing each configuration/partition. A configuration can be thought of as the declaration of a partition, so the use of either "configuration" or "partition" is equally valid, depending on whether the emphasis is on the declaration or the resulting partition.

The artifacts that are assigned to each partition are placed within the partition to which they are assigned by a partitioning system 416 that forms part of the deployment manager 304. Within the configuration editor 418, artifacts are represented by the icons used to represent the artifacts in the project's resource graph, with each artifact icon placed in the area representing the partition to which the artifact is assigned. Since an artifact may be assigned to multiple partitions (or configurations 338), the artifact may be represented multiple times within the visualization.

A developer may edit partition definitions by adding and/or removing artifacts from a configuration by re-assigning them to a different partition. Additional partitions can be created, and artifacts assigned to them. Artifact assignments are subject to correctness constraints enforced by the partitioning system 416. The act of modifying configurations 338 invokes the partitioning system 416 to complete any reassignments required by the developer's actions.

The environment editor 420 visually displays the nodes that are members of an environment. The user may drill down to view the details of any node. Some environments 340 may contain a very large number of nodes. In such cases, all nodes are not necessarily enumerated on a diagram, but each class of nodes is represented by the constraints that define the members of the class of nodes.

These constraints are used by the developer to identify nodes that are defined in a namespace (e.g., an abstraction of a virtual environment) that should be members of a particular environment. An environment may have any number of constraints for identifying nodes. Nodes may also be assigned to the environment individually by the developer.

An environment may be edited by explicitly adding/removing nodes from the environment or by adding/removing/modifying a constraint that identifies a set of nodes to be included in the environment. If the developer is using constraints to specify membership, the environment editor 420 provides a mechanism for the developer to view the set of nodes identified by each constraint.

The nodes in the environment may be edited by drilling down into a node. Any changes to the properties of the node may cause the node to become a member of a different node class.

The deployment editor 422 visually displays the assignment of partitions to nodes or node classes based on the binding declared in the deployment. The deployment environment editor 420 is also capable of visualizing artifacts assigned to each partition and deployment parameters that modify the definition of each artifact within the deployment. A developer may edit the deployment parameters by selecting an artifact and changing the environment parameters bound to that artifact. If the artifact does not support environment parameters, the edit option will be disabled.

The developer may also view the status of the deployment on the visualization as each node visible on the diagram displays a status indicating whether the deployment is in progress, completed or has produced an error. The developer may drill down into indicated errors to diagnose the deployment problem.

Referring again specifically to FIG. 4, the deployment manager 304 may be used by a developer (or development team) to define a project for each target environment (which in turn comprises a collection of nodes). For example, the project 404 may be developed for the development environment 406, the project 408 may be developed for test environment 410, and the project 412 may be developed for the production environment 414. Thus, the deployment manager 304 facilitates the deployment of multiple instances of an event-driven application to separate environments, while addressing the following challenge: the application may be bound to different physical resources in each of the target environments (e.g., the development environment 406, the test environment 410, and the production environment 414). For example, the target nodes may all belong to common logical partitions, but production nodes may be physically distinct from test nodes. Similarly, sources are bound to different physical resources in different environments. FIG. 4 also shows that configurations 338, in the form of respective configuration files, are deployed to the respective projects from the partitioning system 416.

Figure 5:
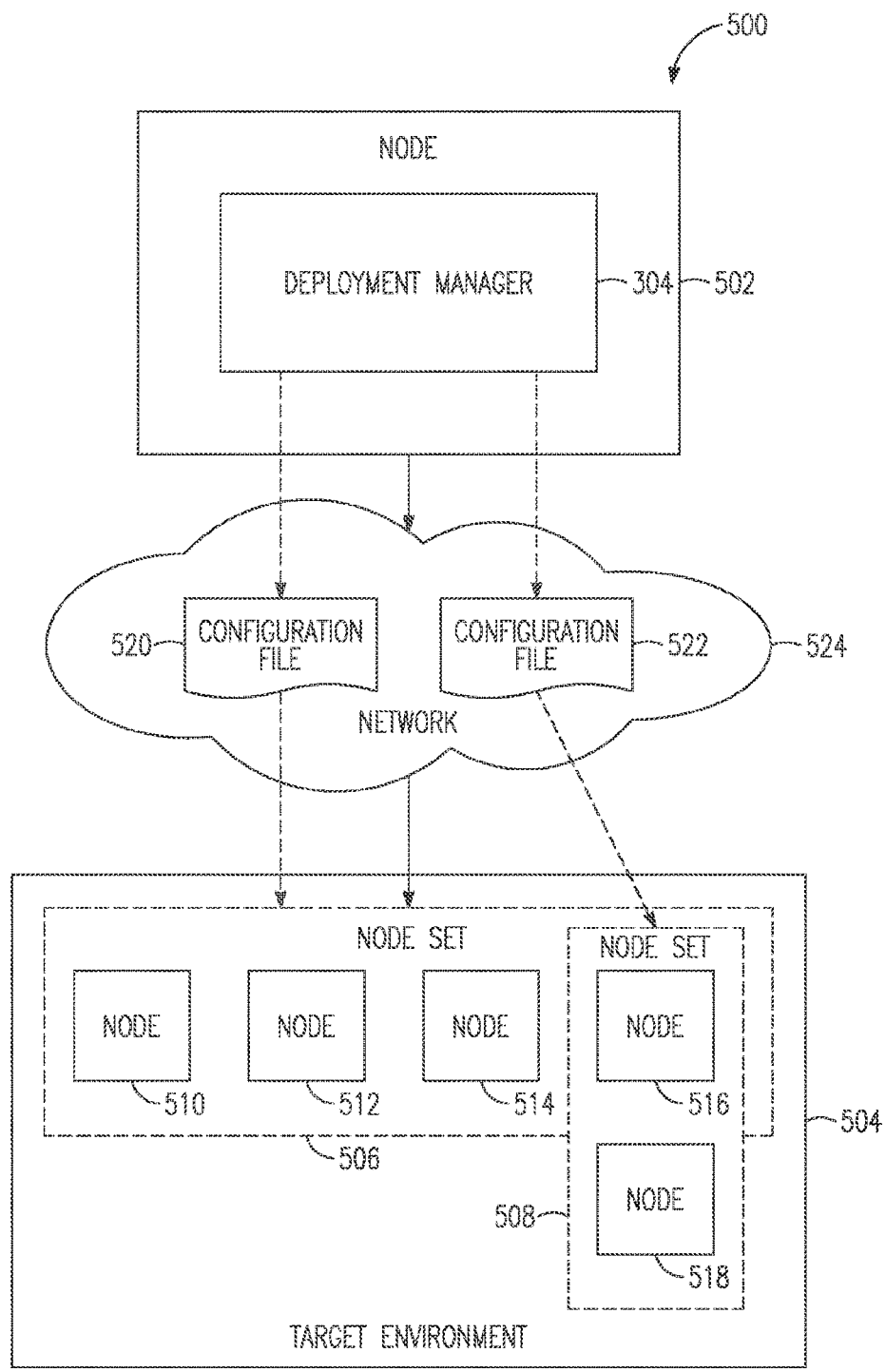
FIG. 5 illustrates a deployment environment 500 in accordance with one embodiment.
Figure 6:
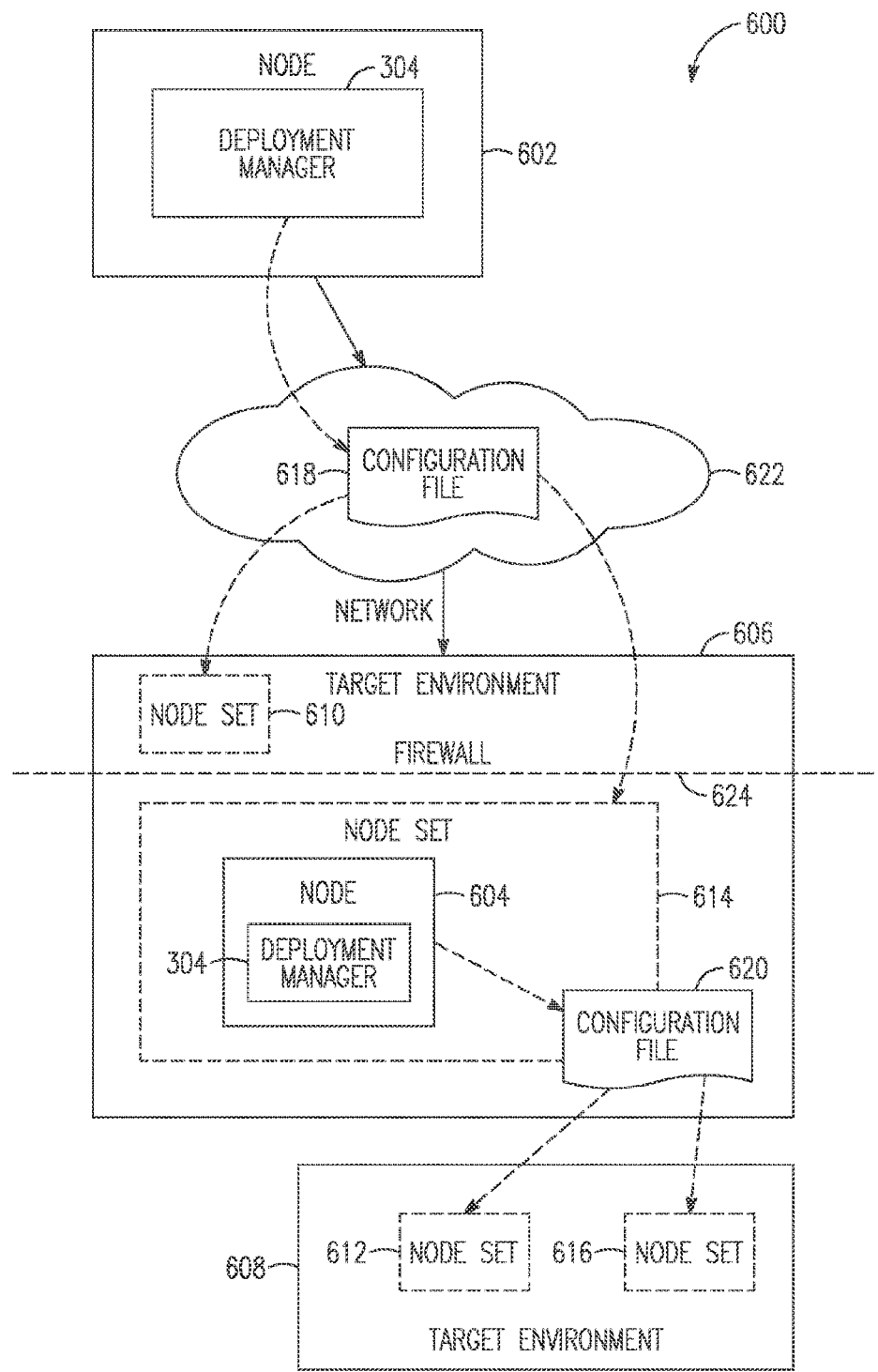
FIG. 6 illustrates a deployment environment 600 in accordance with one embodiment.

FIG. 5 and FIG. 6 illustrate respective scenarios for the deployment of configuration files to target environments. Referring specifically to FIG. 5, in a deployment environment 500, deployment manager 304, operating on a node 502, outputs two configuration files, namely configuration file 520 and configuration file 522, via a network 524 to a target environment 504. The configuration file 520 defines a first configuration (or partition) for a node set 506, which includes node 510-node 516. The configuration file 522 defines a second configuration (or partition) for a node set 508, which includes node 516 and node 518. It will accordingly be appreciated that a particular node may be shared between multiple node sets, such as node 516 which is shared by the node set 506 and of the node set 508.

Referring now to FIG. 6, a further deployment environment 600 is shown in which a particular parent configuration, represented by configuration file 618, contains other child configurations (e.g., represented by configuration file 620) in its manifest. FIG. 6 shows that the parent configuration file 618 is deployed from a first deployment manager 304, executing on a node 602, out to a target environment 606, via a network 622. The target environment 606 includes multiple node sets, including a node set 610 and a node set 614. The parent configuration file 618 is used to instantiate a further child deployment manager 304 on the node 604 of the node set 614. The child deployment manager 304 is then responsible for deployment of the child configuration, represented by the child configuration file 620, to a further target environment 608, which includes further node sets, including node set 612 and node set 616.

Figure 7:
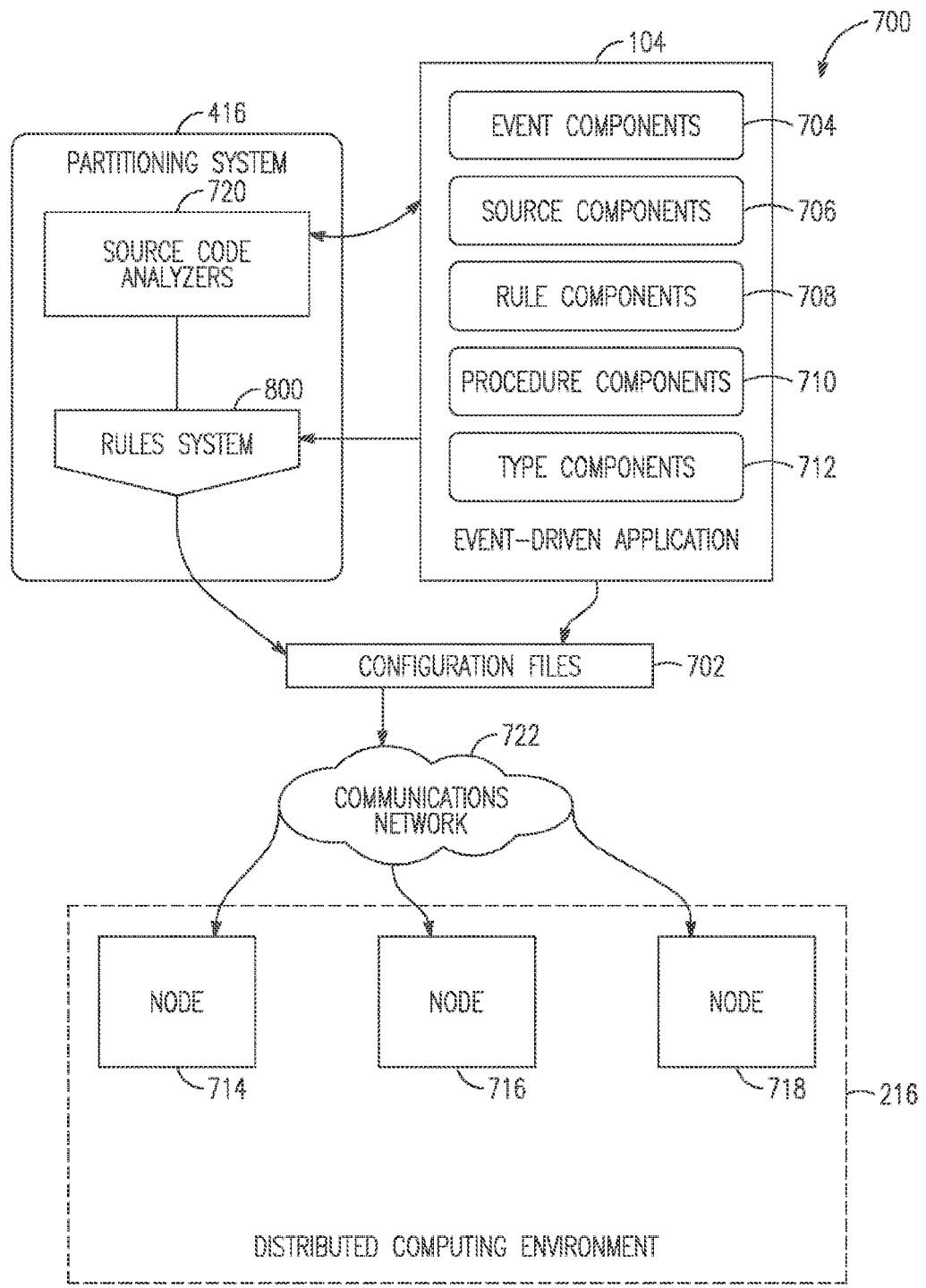
FIG. 7 illustrates a distributed computing environment 700 in accordance with one embodiment.

FIG. 7 is a diagrammatic representation showing further details regarding the partitioning system 416, according to some example embodiments. Specifically, the partitioning system 416 is shown to include several source code analyzers 720, which operationally analyze the source code of an event-driven application 104, to infer relationships between the components of the event-driven application 104, and further to discover remote references by such components. Further details regarding the source code analysis, as performed by the source code analyzers 720, are discussed below.

Considering the event-driven application 104, such applications are executed in response to the reporting of an event within a distributed computing environment 216, within which the event-driven application 104 is deployed. Each such event may indicate the completion of an activity that is of interest to the event-driven application 104. Events arrive at a particular event-driven application 104 from a variety of sources over a communications network 722 and may range, for example, from the reading of a value from a sensor within the distributed computing environment 216, to the identification of a new strategic initiative by a user operator of the event-driven application 104.

FIG. 7 shows that an event-driven application 104 may include a number of specialized components, with primary component classes including:
event components 704;
source components 706;
rule components 708;
procedure components 710; and
type components 712.

An event-driven application 104 may run within the distributed computing environment 216 such that each of the components of the event-driven application 104 are located on one or more computational notes (e.g., node 714, node 716, or node 718) within the distributed computing environment 216.

The distributed computing environment 216 is shown in FIG. 7 to include a set of computational nodes in the form of node 714-node 718, with each node representing computing resources that can execute code, store data and communicate with other computational nodes over the communications network 722. The computational nodes may be hosted in public clouds, private clouds, data centers or edge environments. Furthermore, a computational node has a unique address, using which other computational nodes may communicate with the relevant computational note. An event-driven application 104 executes in the distributed computing environment 216 by allocating components of the event-driven application 104 to one or more available computational nodes, such that execution proceeds through the collaborative actions of the participating computational nodes within the distributed computing environment 216.

Figure 8:
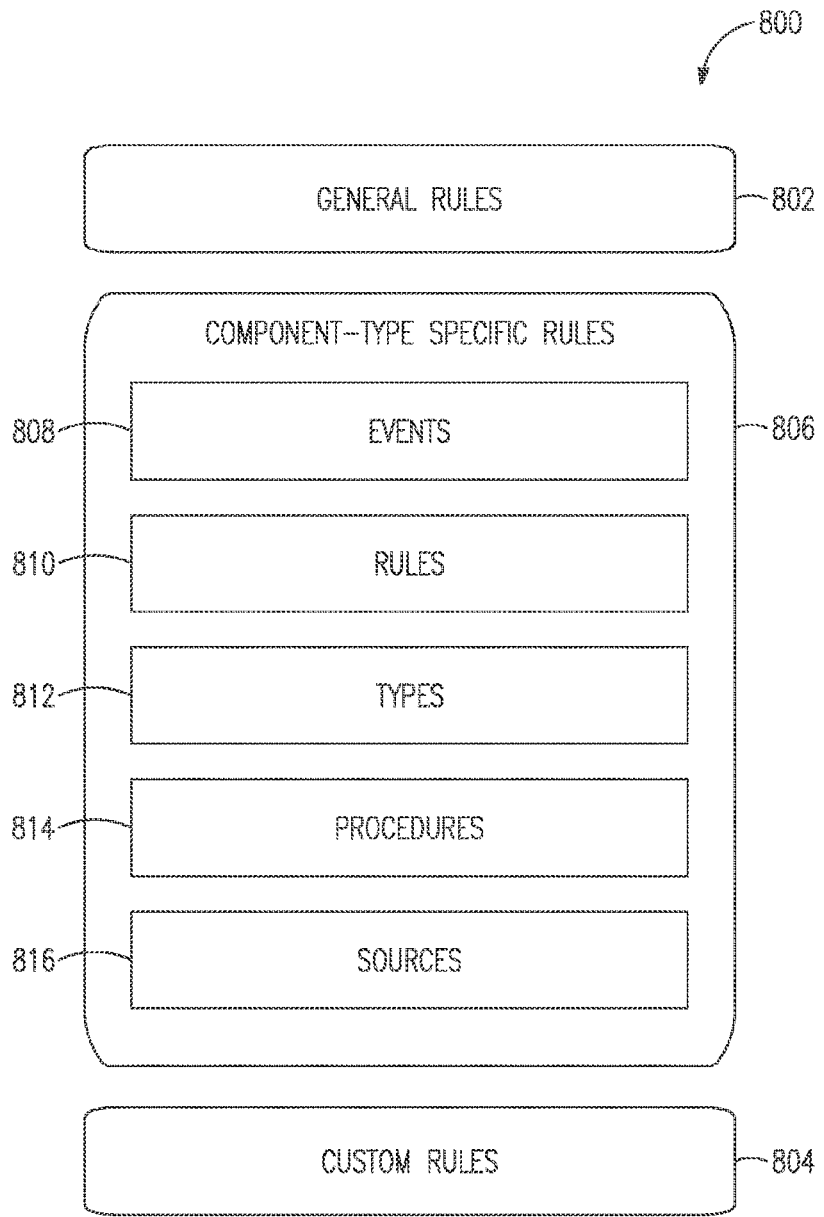
FIG. 8 illustrates a rules system 800, in accordance with one embodiment.

FIG. 8 is a diagrammatic representation of the rules system 800, shown in FIG. 7, which operatively outputs configurations, in the form of configuration files 702, according to which various components of the event-driven application 104 are deployed to computational nodes within the distributed computing environment 216. Specifically, the rules system 800 includes rule sets that are applied to analyze the source code of the event-driven application 104, and to determine node set assignments. The identification of node sets, as well as the assignment of components of an event-driven application 104 to these node sets, are described in further detail below As shown in FIG. 8, the rules system 800 includes a number of rule sets to define abstract sets of computational resources, known as node sets, to which application components are assigned. The rules system 800, and the relevant rule sets apply assignment rules to the analyzed code to determine node set assignments. The rules system 800 also includes a schema for extending assignment rules to accommodate the specialized needs of specific event-based applications.

The rules system 800 includes three broad categories of rules, namely general rules 802, component-type specific rules 806, and custom rules 804. The rules system 800 applies these three categories of rules to assign components of an event-driven application 104 to node sets. This is done by recursively applying the general rules 802, which are broadly applicable to all component types, followed by the applying of the component-type specific rules 806, which are applicable to single component types, and then followed by the applying of the custom rules 804.

The component-type specific rules 806 include events 808, rules 810, types 812, procedures 814, and sources 816. Further details regarding the application of these rules are discussed below, with reference to FIG. 9.

Figure 9:
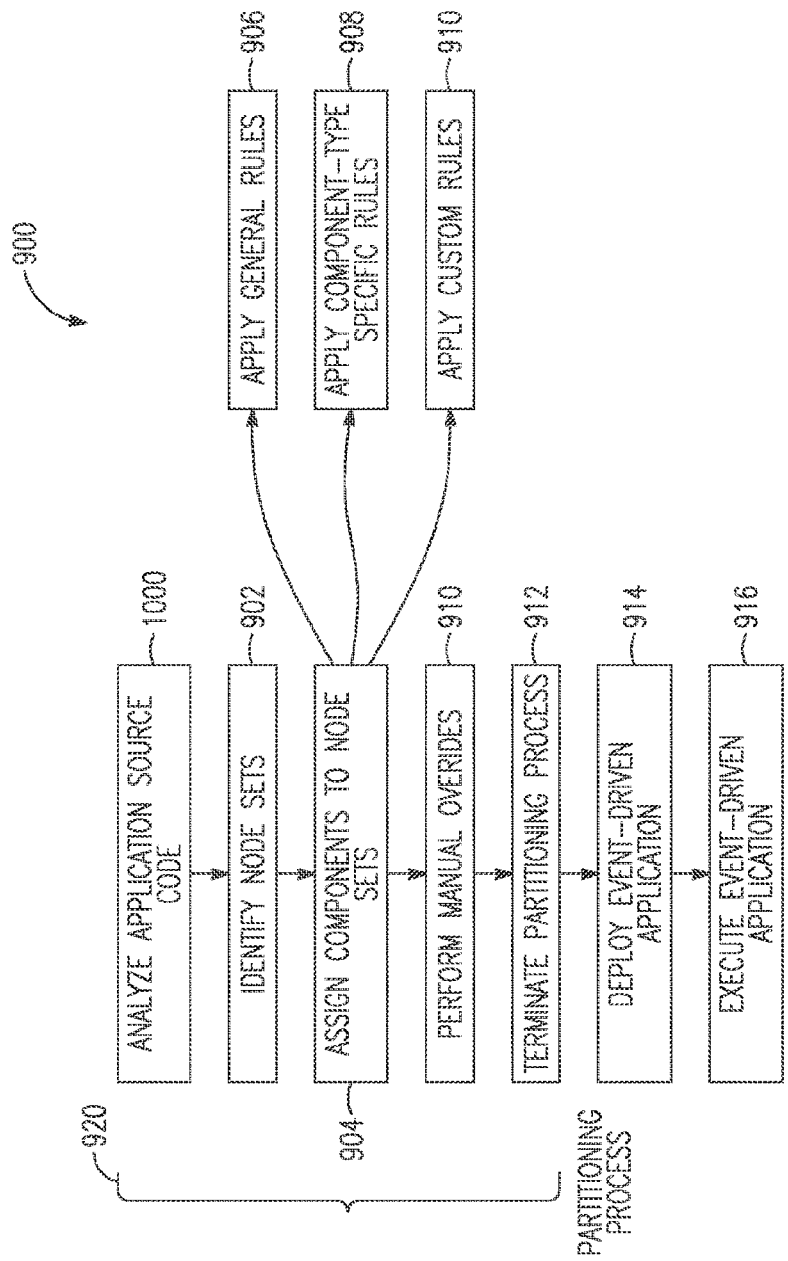
FIG. 9 illustrates a method 900 in accordance with one embodiment.

FIG. 9 is a flowchart illustrating a method 900, according to some example embodiments, to partition, deploy and execute an event-driven application 104 within a distributed computing environment 216.

In contrast to the method 900, certain methods and tools for the construction of a distributed, event-based application may require the manual assignment of components to computational nodes, via explicit programmer actions. Such assignment activity is labor-intensive, error-prone and, in many cases, results in a suboptimal allocation of application components to computational nodes. Certain efforts to automate such assignments focus on identifying objects, which are then manually assigned to a specific computational node as the basis for distributed communication among the nodes, but with limited focus on the optimal allocation of additional components to each node.

The method 900, in some example embodiments, may be deployed to precisely determine minimal code that can be assigned to each computational node of a distributed computing environment 216. To this end, the method 900 may exploit a programming notation for specifying classes of computational nodes, on which a programming directive should be executed.

At a high-level, the method 900 comprises a partitioning process 920 in order to automatically allocate components of an event-driven application 104 to node sets (and, by inference to computational nodes assigned to each node set), followed by a deployment process for the event-driven application 104 (operation 914), and an execution process for the event-driven application 104 (operation 916). The partitioning process 920 exploits a programming notation to specify a class of computational nodes on which a programming directive should be executed.

Programming Notation

The partitioning process 920, as performed by the partitioning system 416, is, in some example embodiments, based on the notion that components of an event-driven application 104 are allocated to nodes in a distributed computing environment 216 to ensure the correctness of the event-driven application 104, and to optimize performance and availability of the event-driven application 104. However, the assignment to specific nodes during an application development process is challenging, for the reason that developers may have only an abstract view of the ultimate topology of a target distributed computing environment 216 during application development. To address this technical challenge, the partitioning process 920 and partitioning system 416 define, in some example embodiments, an abstract model of a distributed computing technology by identifying node sets that represent one or more nodes that will exhibit properties associated with the particular node set. Consider the example where a developer knows that there will be computational resources (e.g., computational nodes) associated with refrigeration units in an IoT application, but a number of such notes, their locations and identities remain unknown until late in the deployment process (operation 914), and until well after the allocation of components of the event-driven application 104 to computing resources is complete. The partitioning system 416 and partitioning process 920, according to some example embodiments, abstract these assignments by supporting a declarative model, in which the developer specifies references to components by specifying a logical constraint that the computing resource must meet. The logical constraint is subsequently formalized as a node-set, which may contain one or more nodes in a final deployment topology. Returning to the example of the refrigeration units, the computing resources associated with the refrigeration units may be specified, for example, by the processing constraint as follows:

PROCESSED BY ManagedEquipment="refrigeration"

Application Analysis

Referring specifically to the partitioning process 920, at operation 1000, the source code analyzers 720 analyze the event-driven application 104, in preparation for node set of discovery and component assignment activities.

Figure 10:
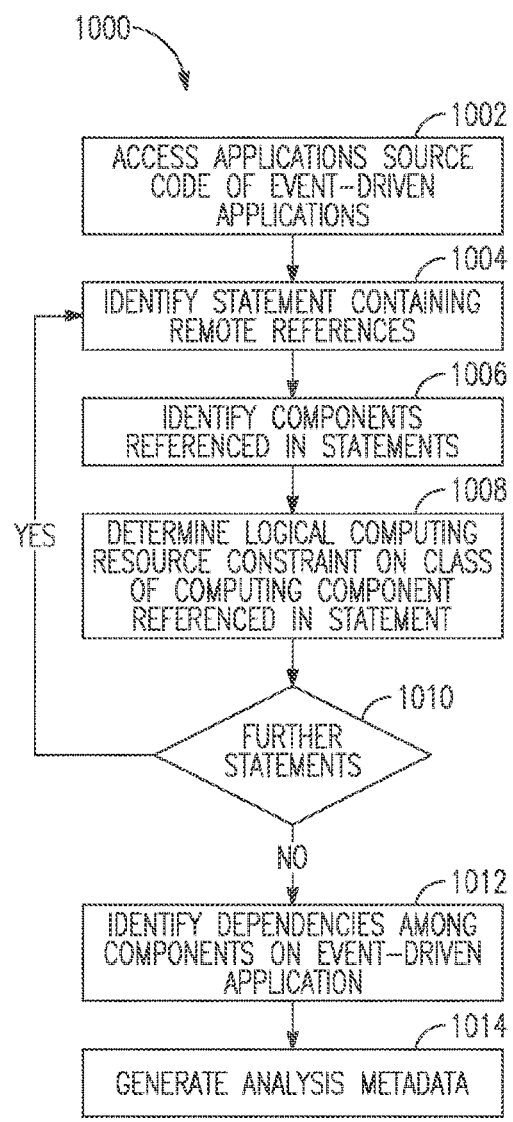
FIG. 10 illustrates an operation 1000 in accordance with one embodiment.

FIG. 10 is a flowchart illustrating further sub-operations or the operation 1000, performed by the source code analyzers 720, to analyze application source code. Specifically, operation 1000 commences with operation 1002, where the source code analyzers 720 access the source code of a particular event-driven application 104.

At operation 1004, the source code analyzers 720, identify statements, within the application source code, containing remote references, where after, at operation 1006, the source code analyzers 720 identify components being referenced in such statements.

At operation 1008, the source code analyzers 720 determine logical computing resource constraints on the class of computing resources needed to post the referenced component.

At decision operation 1010, the source code analyzers 720 determine whether there are further statements, within the application source code, containing remote references. If so, the operation 1000 loops back to operation 1004. On the other hand, should it be determined at decision operation 1010 that no further statements containing remote references to process, the operation 1000 progresses to operation 1012, wherein the source code analyzers 720 operate to identify dependencies among components of the event-driven application.

At operation 1014, the source code analyzers 720 then generates analysis metadata, which is used to drive further operations of the partitioning process 920.

Returning to FIG. 9, at operation 902, the source code analyzers 720 of the partitioning system 416 proceeds to identify node sets.

Event Mesh Broker

Figure 11:
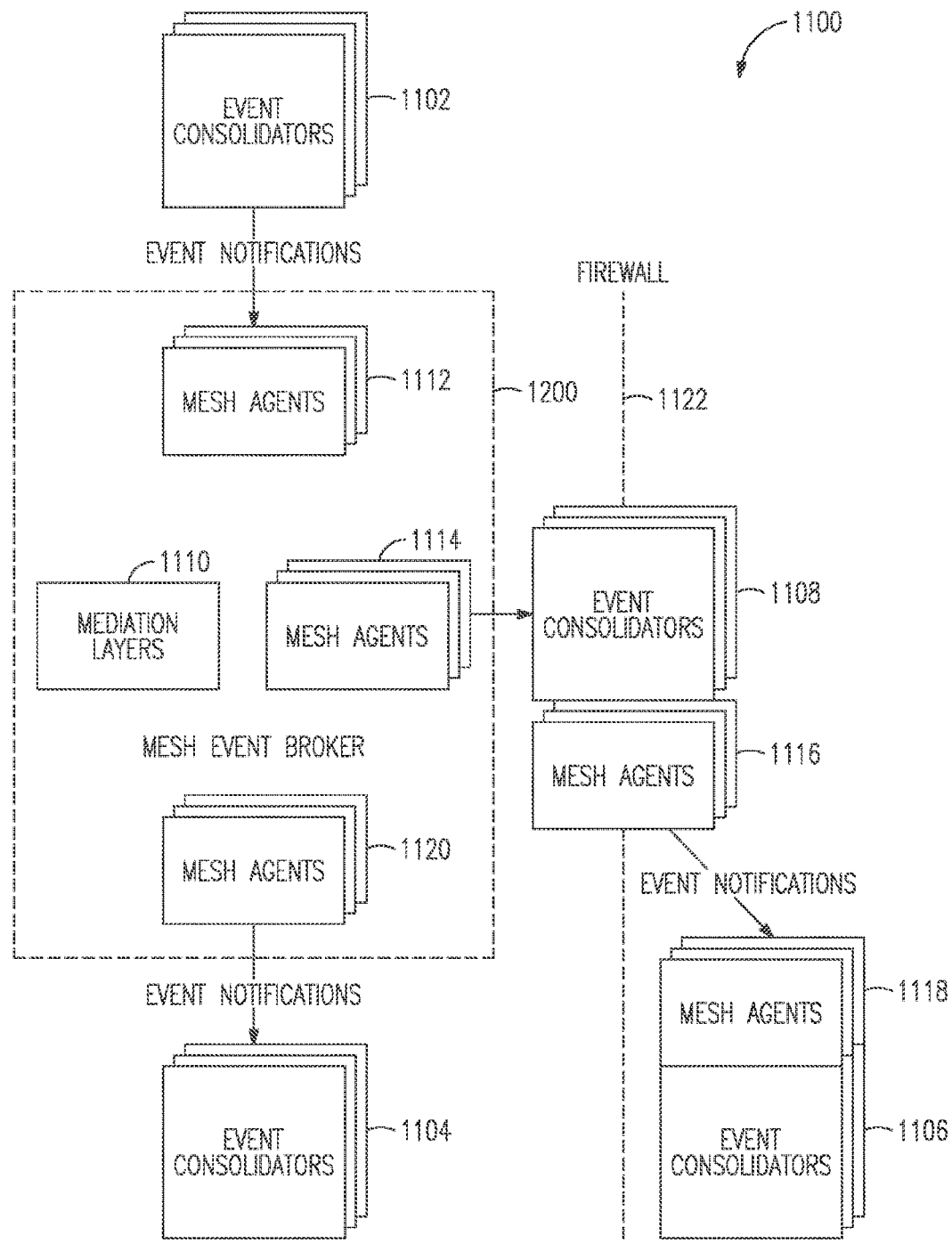
FIG. 11 illustrates a distributed computing environment 1100 in accordance with one embodiment.

FIG. 11 is a diagrammatic representation of a distributed computing environment 1100 that includes event producers 1102, a mesh event broker 1200, local event consumers 1104, event consolidators 1108, and external event consumers 1106. Mesh agents (e.g., mesh agents 111212-mesh agents 1118) are associated with, and reside next to, each of these producer and consumer components with the disturbed distributed computing environment 1100. The mesh agents are responsible for implementing the mesh event broker 1200, and should accordingly be conceptually viewed as part of the mesh event broker 1200, as shown in FIG. 11. Each mesh agent may thus in effect act as a stand-alone event broker or as part of a collective of agents that together constitute the mesh event broker 1200.

The collection of cooperating mesh agents (e.g., mesh agents 1112-mesh agents 1118) may this operate as a "mediator," (e.g., mediation layers 1110) and form a mesh network supporting direct point-to-point communication. Each cooperating meh agent is provisioned to support augmentation, and to provide delivery of a specific set of producers (e.g., publishers) and consumers (e.g., subscribers) to events published by supported publishers. Similarly, subscribers may be provisioned by mesh agents to augment and deliver events for which they are local subscribers. Even further, the cooperating mesh agents, as a mesh, can forward messages across the mesh to improve event transmission efficiency, and to bridge between agents that are configured on different networks.

The event consolidators 1108 act as store-and-forward containers when producers and consumers are on different networks or isolated by firewalls (e.g., by firewall 1122). event consolidators 1108 may thus allow event producers 1102, on a first network or domain, to transmit event notifications to both the local event consumers 1104 and to external event consumers 1106, the external event consumers 1106 being on a different network or domain than the event producers 1102.

The mesh event broker 1200, according to some example embodiments, facilitates and enriches interactions of the event producers 1102 and the local event consumers 1104 (and the remote external event consumers 1106) within the context of the event-driven, distributed computing environment 1100. The mesh event broker 1200 (including the respective mesh agents) is primarily responsible for the management of the delivery of events, via event notifications, from the event producers 1102 to the local event consumers 1104. The mesh event broker 1200, in contrast to message-oriented middleware, is designed to support the binding requirements for real-time intelligence and situational awareness encountered in real-time digital business, for example. Such requirements may involve using multiple mediation layers 1110 to apply sophisticated mediation activities, such as for example transformations, filtering, correlation, contextualization, and analytics to event traffic flowing through the mesh event broker 1200.

The distributed computing environment 1100, as described above with reference to FIG. 3, may consist of a set of computational nodes, each of which may host or operate as either one (or both) of the event producers 1102 or local event consumers 1104. The event producers 1102 or local event consumers 1104 may in turn may be applications or application components. Each node represents computing resources that can execute code, stored data and communicate with other nodes over a communications network. The computational nodes may furthermore be hosted in public clouds, data centers or edge environments. A computational node has a unique address using which other computational nodes may communicate with the relevant note.

Event-driven applications that may execute in the distributed computing environment 1100 by allocating components of the event-driven application to one or more of the available computational nodes, such that execution proceeds through the collaborative actions of the participating computational nodes.

According to some example embodiments, there is provided a mesh event broker architecture that distributes mediation responsibilities of the mesh event broker across the nodes that are organized as a full or partial mesh network. Specifically, the mediation responsibilities may be distributed among the mesh agents that at least partially or fully constitute the mesh event broker 1200. The architecture furthermore manages a dynamic database of costs associated with transmitting event notifications between any two nodes of the mesh network. To this end, the mesh event broker architecture dynamically selects delivery routes across the mesh network by minimizing the transaction costs between an event producer and an event consumer, as well as the availability of nodes within the mesh network.

The mesh event broker architecture furthermore distributes transformation, filtering, correlation, contextualization, and analytics, as applied to each event, to optimal nodes (e.g., mesh agents) within a distributed computing environment. Finally, the event broker architecture seeks to authenticate requests and applies role-based access controls to each request. Accordingly, in some example embodiments, the mesh event broker architecture provides the functionality required for an advanced event broker in a distributed topology, which operates to replace a centralized mediator with a distributed mediator implemented throughout a mesh network.

The mesh event broker 1200 combines high-productivity tools for ease-of-development and distributed event management with a dynamic mesh deployment. The mesh event broker 1200 seeks to support the continuous awareness, intelligence and agility for event-driven systems, and enables constant monitoring of enterprise/business operations by accepting events from anywhere (e.g. IoT, mobile devices, legacy systems). The mesh event broker 1200 further analyzes, combines and derives events in real-time, and sends events to subscribing applications/application components, thus enabling comprehensive situational awareness.

Figure 12:
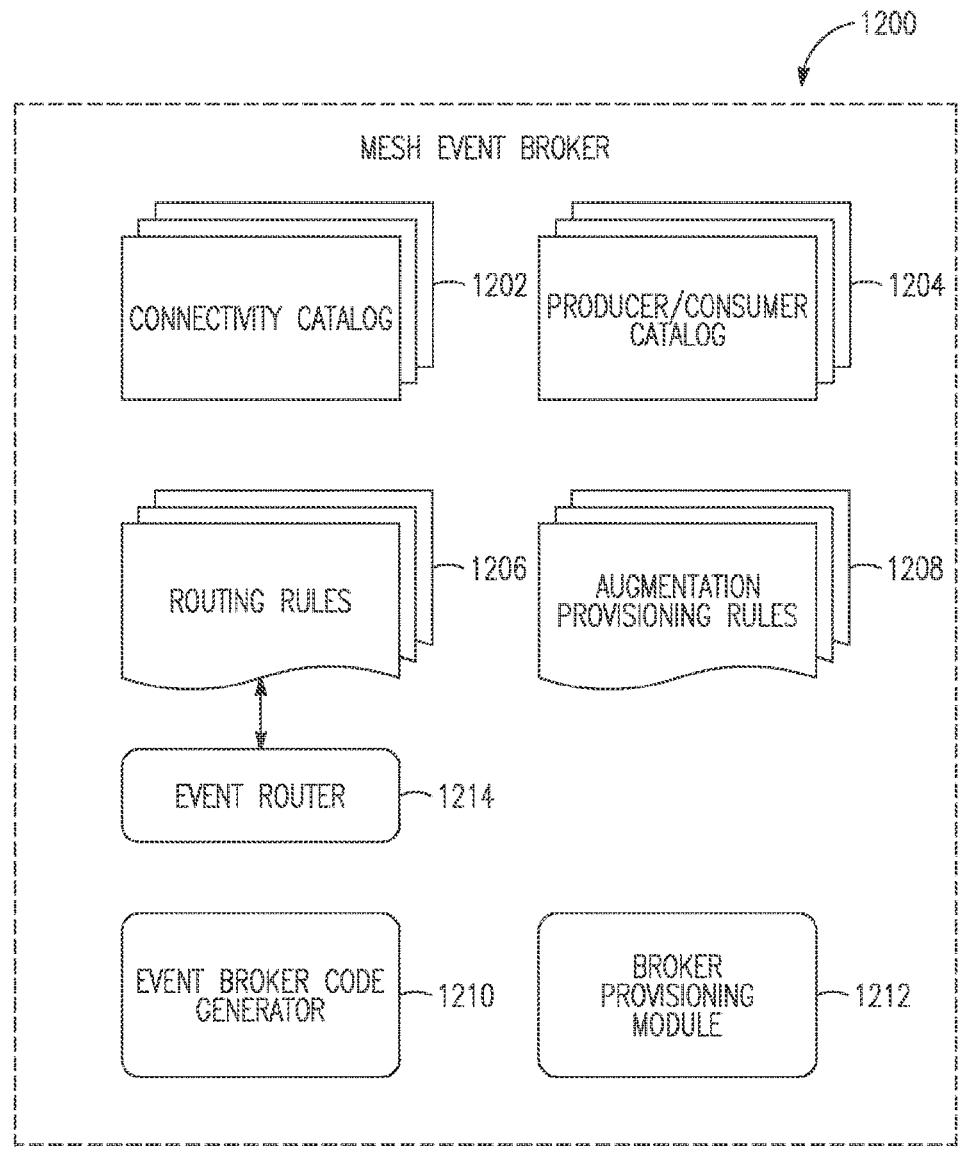
FIG. 12 illustrates a mesh event broker 1200 in accordance with one embodiment.

FIG. 12 is a diagrammatic representation of an architecture of a mesh event broker 1200, according to some example embodiments. The mesh event broker 1200 may be implemented as a fully distributed mediator which is deployed as a mesh (e.g., in either a full mesh network or a partial mesh network).

The mesh event broker 1200 operates to maintain a connectivity catalog 1202, which is a catalog of node-to-node connectivity costs used to optimize dynamic routing of event notifications through a mesh network on which of the mesh event broker 1200 is implemented. To this end, the connectivity catalog 1202 may record and store costs associated with transmitting event notifications between node pairs, these costs being encoded as numeric values, with the lowest-cost routes having numerically smaller values and the higher cost routes having numerically higher values. A special case is one in which nodes participating in the mesh network have no connectivity to each other. In such cases, the cost, as recorded within the connectivity catalog 1202, is set to a number larger than any costs that can be associated with a node pair that is directly connected. The connectivity catalog 1202 may also be maintained by removing records (or data) for any nodes that are currently unavailable from the connectivity catalog 1202 so that these are not considered by routing rules 1206 (discussed below).

The mesh event broker 1200 also operates to dynamically maintain a connectivity catalog 1202, which includes a list of events (e.g., represented by event notifications), event producers 1102 for each event, and local event consumers 1104 for each event. The producer/consumer catalog 1204 also maintains a list of augmentations (e.g., transformations, filters, correlations, contextualizations, and analytics) that may be applied to each event by either event producers 1102 or local event consumers 1104. The producer/consumer catalog 1204 maintains a unique name for each event, the identity, and location of each of the event producers 1102 of the event, and also the location of each the local event consumers 1104 of the event. Locations are specified as the names of nodes associated with each of the event producers 1102 and each of the local event consumers 1104 within a mesh network of a distributed computing environment.

The mesh event broker 1200 further includes routing rules 1206 to dynamically determine an optimal route for delivery of an event notification, from a one or more event producers 1102 to one or more local event consumers 1104. As noted with respect to FIG. 11, events, as represented by event notifications, are routed from event producers 1102 through augmentations provided by mediation layers 1110, to local event consumers 1104. The mesh event broker 1200, using the routing rules 1206, calculates and determines an optimal route through a mesh network for each event producer-event consumer pairing. Further details regarding the use of example routing rules 1206 are provided below, with reference to FIG. 13.

The mesh event broker 1200 further includes augmentation provisioning rules 1208, which are used to dynamically determine optimal locations within a mesh network for performing augmentations (e.g., transformations, filtering, contextualization, analytics, etc.) on events flowing from event producers 1102 to local event consumers 1104. Stated differently, once a route through the mesh network has been identified, augmentations are assigned to nodes of the mesh network, along the identified route. Further details regarding augmentation rules are discussed below, with reference to FIG. 15.

The mesh event broker 1200 further includes an event broker code generator 1210, and a broker provisioning module 1212. The event broker code generator 1210 operates to dynamically produce rule sets that implement augmentations and routing required to implement semantics of the event producers 1102 and local event consumers 1104 for each particular event. More specifically, the provisioning may result in an event mesh map, indicating where in mesh network event producers 1102, mediation layers 1110, consolidators and augmentations are to be located. Based on the event information map, the event broker code generator 1210 produces instructions required by each node of the mesh network to implement the semantics of the event producers 1102, mediation layers 1110, consolidator, and augmentations. The generated code is a set of rules annotated with the identities of the nodes on which these rules should be provisioned.

The broker provisioning module 1212 operates to dynamically deploy the rule sets, produced by the event broker code generator 1210, to nodes identified using the routing rules 1206 and augmentation provisioning rules 1208. Specifically, once the code (e.g., set of rules) has been generated by the event broker code generator 1210, the code must be provisioned into the mesh network. The broker provisioning module 1212 performs this function by creating a configuration for each node that contains the set of rules that must be provisioned onto that node, and any further resources required to support the rules. The configurations (e.g., configuration files) are then presented to a deployment manager, which in turn sends the configured resources to each node, and directs the local node to install the rules and prepare these rules for execution.

As noted above with reference to FIG. 12, events, as represented by event notifications, are routed from an event producer to an event consumer (e.g., event subscriber). To this is end, the mesh event broker 1200 uses the routing rules 1206 to determine and select an optimal route for an event notification, from each producer to each consumer of the relevant event. FIG. 12 shows that the routing rules are implemented by an event router 1214, which also forms part of the mesh event broker 1200.

Turning to the different ways in which the event router 1214 implements the routing rules 1206 for each of the event producers and event consumers, first consider event producers. The event router 1214 evaluates each event producer and locates the relevant event producer within an event mesh by performing a lookup in the producer/consumer catalog 1204, to identify a node within the mesh network on which the producer resides.

The implementation of the routing rules 1206, as implemented by the event router 1214, for each event consumer is described with reference to FIG. 13-FIG. 17 below.

Figure 13:
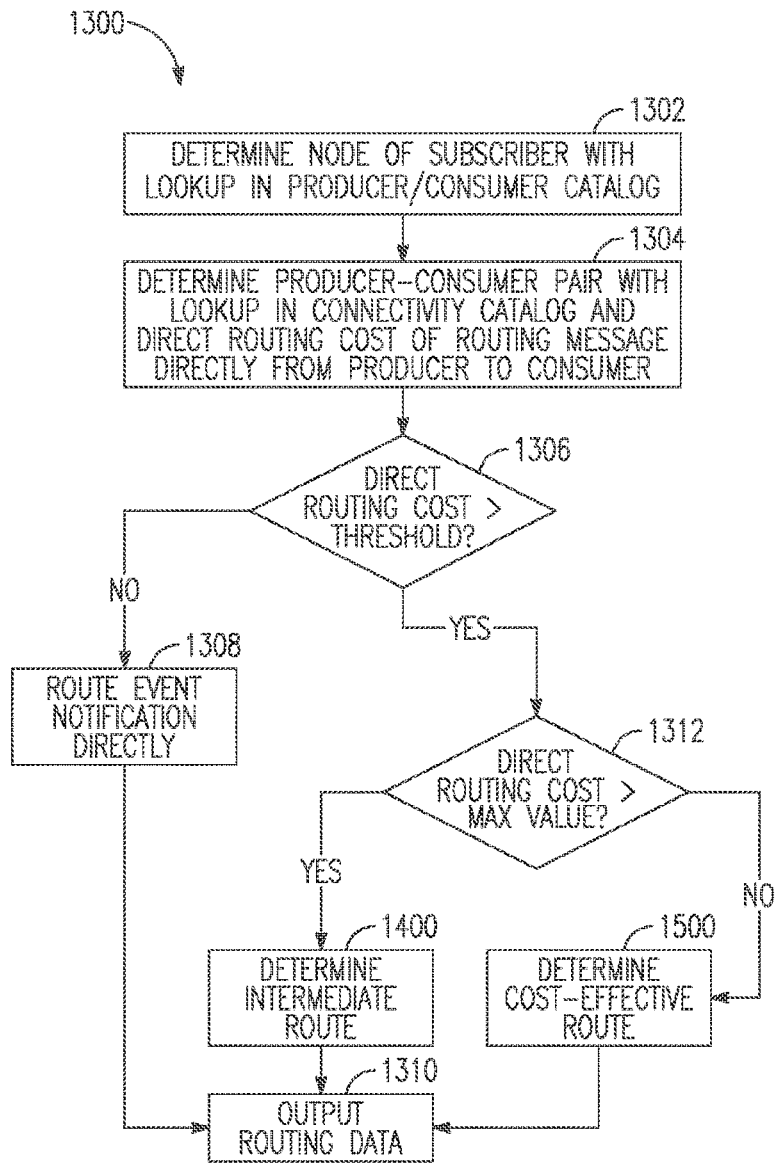
FIG. 13 illustrates a method 1300 in accordance with one embodiment.

FIG. 13 is a flowchart illustrating a method 1300, according to some example embodiments, that is performed by the event router 1214, in order to implement the routing rules 1206 for each event consumer within a distributed computing environment. The method 1300 commences at operation 1302, with the event router 1214 locating a subscriber, associated with the evaluated consumer, within an event mesh by looking up the relevant subscriber in the producer/consumer catalog 1204 to determine a node within the distributed computing environment on which the relevant subscriber resides.

At operation 1304, the event router 1214 determines a producer-consumer pair by performing a lookup in the connectivity catalog 1202, and also retrieves and determines an assigned cost of routing an event notification directly from the relevant producer to the consumer under evaluation.

At decision operation 1306, the event router 1214 determines whether the cost of routing the event notification directly from the relevant producer to the evaluated consumer transgresses a configurable threshold (e.g., is above the current applicable threshold). If the direct routing cost is evaluated at decision operation 1306 to be acceptable (e.g., below the configurable threshold), the method 1300 proceeds to operation 1308, where the event router 1214 determines to route the respective event notification directly, and updates and outputs routing data, at operation 1310.

On the other hand, should the event router 1214 determine at decision operation 1306 that the direct routing cost is unacceptable (e.g., above the configurable threshold), the event router 1214 proceeds to determine an alternative, indirect route by progressing to decision operation 1312.

At decision operation 1312, the event router 1214 assesses whether the direct routing cost transgresses a further maximum value threshold. Based on a determination at decision operation 1312 that the direct routing cost between the relevant producer and consumer, in fact, does transgress the maximum threshold value (e.g., exceeds the maximum threshold value), it is assessed that the producer and consumer are not directly connected, and that an intermediate route through the mesh network is to be determined. Accordingly, following a positive determination at decision operation 1312, the method 1300 proceeds to operation 1400, where the event router 1214 operates to determine an intermediate route, as described with reference to FIG. 14.

On the other hand, if it is determined by the event router 1214, at decision operation 1312, that the direct routing cost transgresses the threshold (decision operation 1306), but does not transgress the maximum value threshold (decision operation 1312), a determination (or assessment) is automatically made by event router 1214 that there may be a more cost-effective route through an intermediate node. Accordingly, based on a negative determination at decision operation 1312, the method 1300 proceeds to operation 1500, where the event router 1214 assesses whether such a more cost-effective route exists. Sub-operations of operation 1500 are described with reference to FIG. 15.

Upon completion of operation 1400 or operation 1500, the method 1300 then again progresses to operation 1310, with the output of routing data by the event router 1214.

Figure 14:
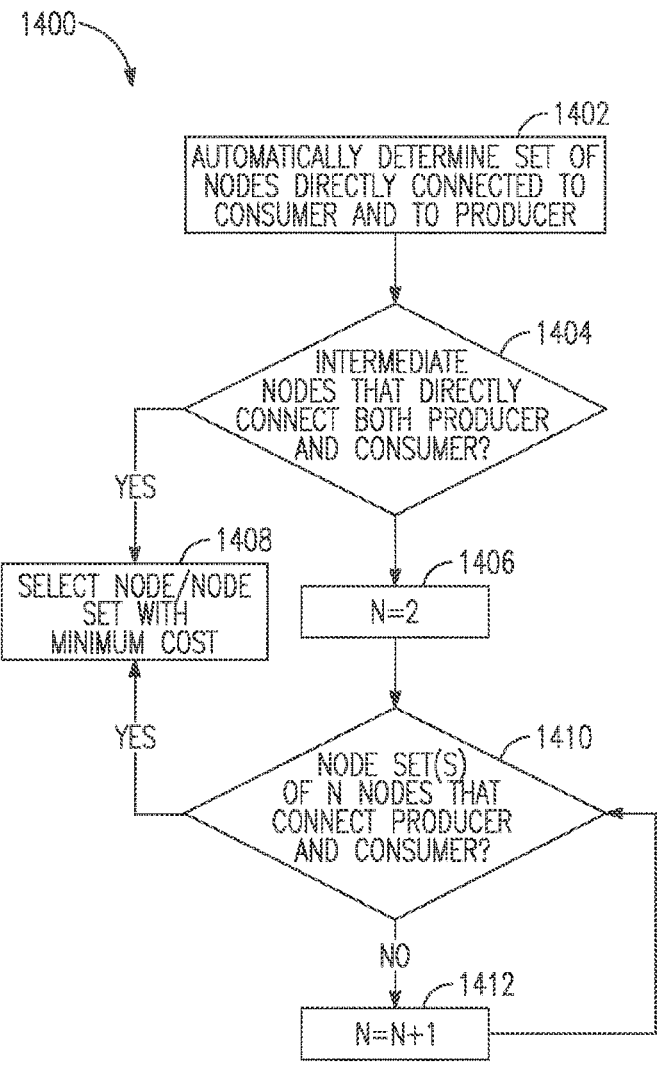
FIG. 14 illustrates an operation 1500 in accordance with one embodiment.

FIG. 14 is a flowchart illustrating sub-operations of the operation 1400 to determine an intermediate route, from a producer to a consumer (assessed at decision operation 1312 to be not directly connected).

The operation 1400 commences at operation 1402, with the automatic determination and identification of a set of nodes that are directly connected to each of the consumer and the publisher of the producer-consumer pairing.

At decision operation 1404, the event router 1214 determines whether there exist any intermediate nodes that directly connect both the consumer and the producer. If so, following a positive determination at decision operation 1404, the event router 1214, at operation 1408, selects a node (or node set) whose connectivity costs for transmission of an event notification from the producer to the intermediate node, and from the intermediate node to the consumer, provides a minimum cost based on the cost information reflected in the connectivity catalog 1202.

On the other hand, if the event router 1214 determines at decision operation 1404 that there is no single intermediate node that directly connects to both the event producer and the event consumer, the event router 1214 commences a search for a minimum set of intermediate nodes that connect both the event producer in the event consumer. This search commences at operation 1406 with the expansion of the set of intermediate nodes being evaluated (e.g., N=2).

It will be appreciated that there might be multiple sets of intermediate notes that connect between the event producer and the event consumer that needed to be evaluated. At decision operation 1410, the event router 1214 identifies all such node sets that connect to the producer and consumer. Should the event router 1214 make a negative determination that decision operation 1410 (e.g., that there are no intermediate node sets of two or more nodes that connect to the producer and consumer), the operation 1400 progresses to operation 1412, where the event router 1214 increments the value of N (e.g., to 3), and loops back to decision operation 1410.

The operation 1400 proceeds to iterate between decision operation 1410 and operation 1412, until a positive determination is made at decision operation 1410 (i.e., one or more sets of nodes of N nodes are identified that connect the relevant producer and consumer). Following a positive determination at decision operation 1410, the operation 1400 progresses back to operation 1408, where the event router 1214 selects the node set, from the node sets determined at decision operation 1410, with a minimum cost of transmitting an event notification between the relevant event producer and consumer. Accordingly, the operation 1400 continues to evaluate node sets, at decision operation 1410, by adding one additional node to the set of intermediate nodes until a solution is found. Note that a solution will always be delivered by the operation 1400 as the network is a mesh, and at least one route will exist between the evaluated producer-consumer pair.

Figure 15:
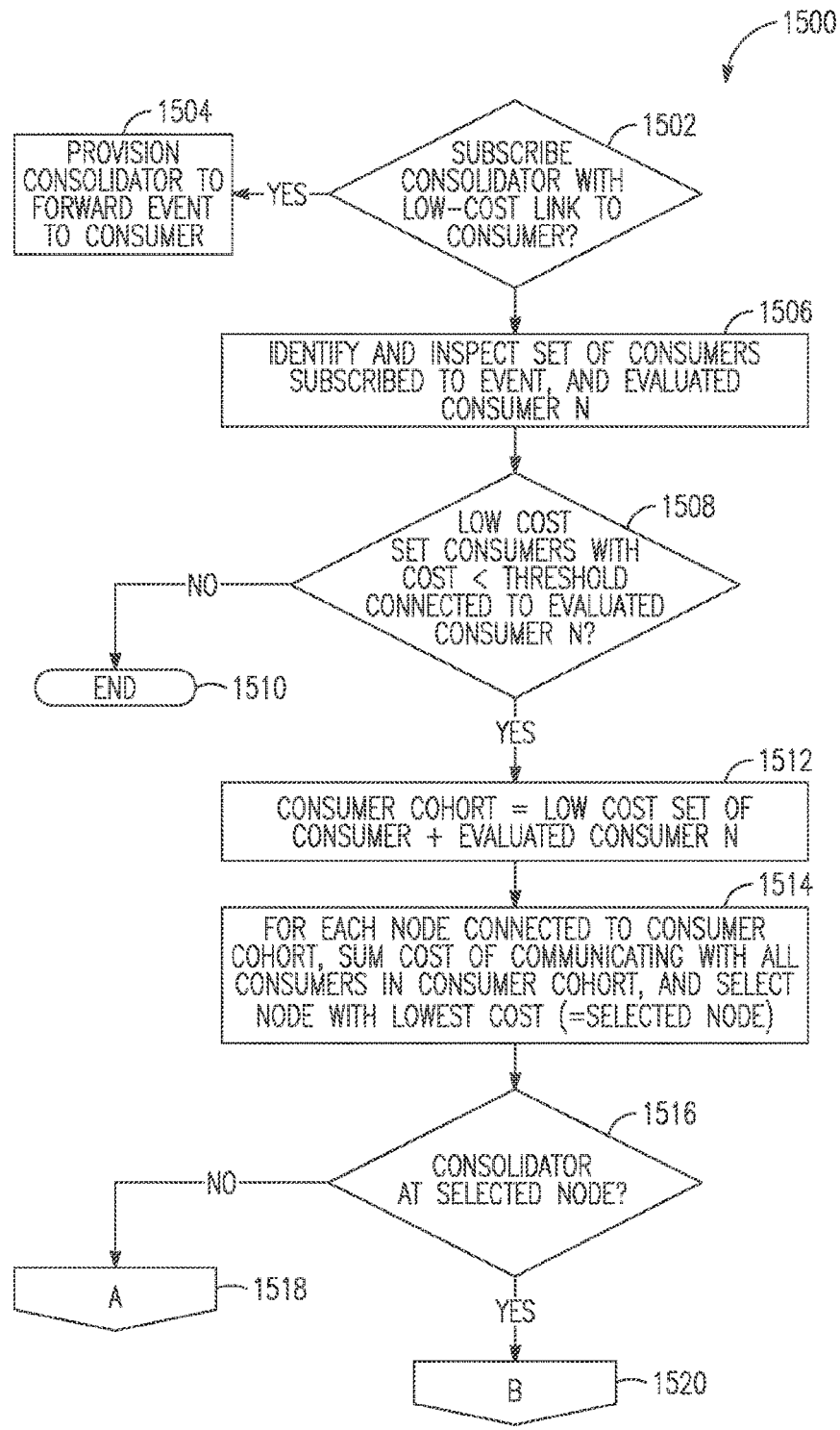
FIG. 15 illustrates an operation 1500 in accordance with one embodiment.
Figure 16:
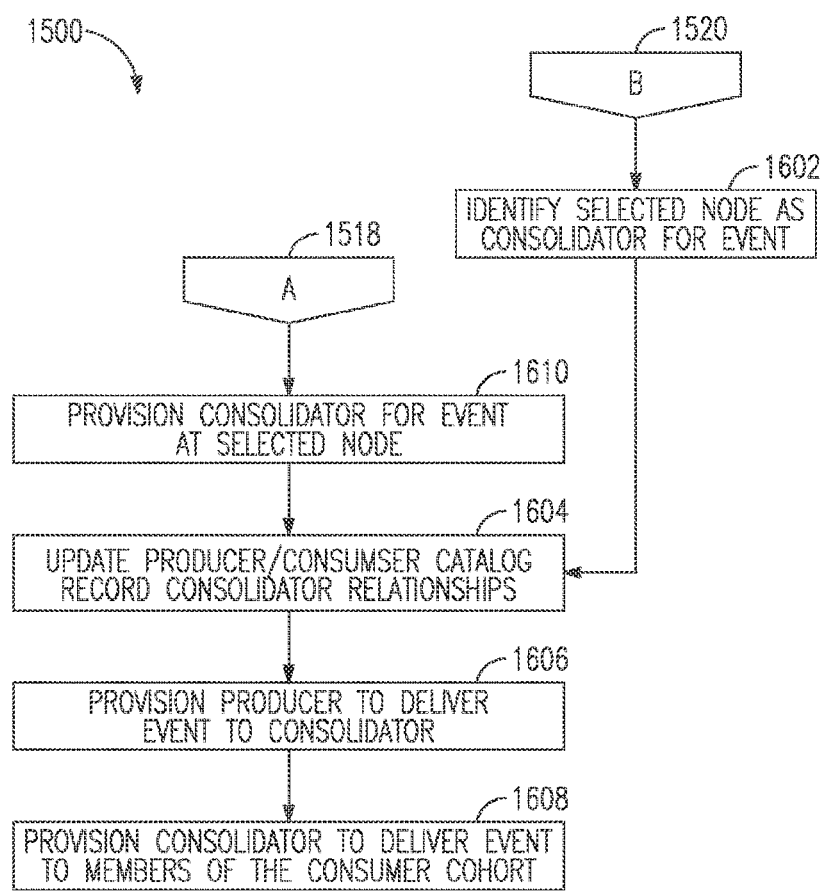
FIG. 16 illustrates an operation 1500 in accordance with one embodiment.

FIG. 15 is a flowchart illustrating various sub-operations of the operation 1500, according to some example embodiments, to determine a most cost-effective route between an event producer and an event consumer, and an intermediary, if the direct routing cost is above a configurable threshold (decision operation 1306), but below a maximum cost value (decision operation 1312).

A direct route almost always delivers a lowest cost for transmission of an event notification between a single producer-consumer pairing. However, in certain example scenarios, an event producer may deliver an event, by way of an event notification, to multiple subscribers over a high-cost route. In such cases, a high cost may be paid once between the event producer and the intermediate node, and low-cost communication may be available between the intermediate node and several consumers of the event within the mesh network. In this case, routing may be determined according to the operation 1500, which is described with reference to FIG. 15.

The operation 1500 references a consolidator, which operationally may be an intermediate node that operates to consolidate event notifications to one or more event consumers.

The operation 1500 commences at decision operation 1502, where the event router 1214 determines whether there exists a consolidator (e.g., an intermediate node) that has a low-cost link to the event consumer, and is subscribed to the event. If so, following a positive determination at decision operation 1502, the subscribed consolidator is provisioned, at operation 1504, by the event router 1214 to forward the relevant event to the event consumer.

On the other hand, following a negative determination by the event router 1214 at decision operation 1502 (i.e., that no such consolidator exists), the operation 1500 advances to operation 1506.

At operation 1506, a set of consumers subscribed to the relevant event is obtained by the event router 1214 by searching the producer/consumer catalog 1204. Further, at operation 1506, the identified set of consumers is inspected (or evaluated) to identify any event consumers that are close, within the context of the mesh network, to a consumer currently being evaluated (i.e., an evaluated consumer N). Each consumer subscribed to the event may be evaluated at decision operation 1508. Specifically, each consumer, within the set identified at operation 1506, is assessed at decision operation 1508, to determine whether there is at least one additional consumer with low cost (e.g., below a cost threshold) connectivity to the evaluated consumer N, this set of low-cost consumers being designated as a low-cost set of consumers.

At operation 1512, the event router 1214 then creates a consumer cohort by combining the low-cost set of consumers with the evaluated consumer N.

At operation 1514, a node that has a lowest cost connectivity to the consumer cohort, created at operation 1512, is identified by summing the cost of communicating with all of the consumers in the consumer cohort, and selecting a node with the lowest cost connectivity.

At decision operation 1516, a determination is made by the event router 1214 regarding whether a consolidator already exists at the low-cost node selected at operation 1514. From decision operation 1516, the operation 1500 progresses via connector 1518 and via connector 1520 to further operations reflected in FIG. 16.

Specifically, following a positive determination at decision operation 1516, the operation 1500 progresses to operation 1602, where the event router 1214 identifies the selected node as a consolidator for the evaluated event.

On the other hand, following a negative determination at decision operation 1516, the operation 1500 progresses to operation 1610, where a consolidator, for the evaluated event, is provisioned for the selected node.

Following completion of operation 1602, or operation 1610, the operation 1500 advances to operation 1604, where the event router 1214 proceeds to update the producer/consumer connectivity catalog 1202 to record the consolidator relationships with respect to the event producers and the event consumers.

At operation 1606, the relevant event producer is then provisioned to deliver the event, via an event notification, to the consolidator. Likewise, at operation 1608, the consolidator is provisioned to deliver the event, via event notifications, to members of the consumer cohort.

It should be noted that a subscription may be removed, causing an update to the producer/consumer catalog 1204. However, responsive to such subscription removals, consolidators are not removed from the producer/consumer catalog 1204 so as to maintain the consolidator as available to service other events and other subscriptions. The above-described operation 1500 results in a lowest communication cost for the aggregate set of producers and consumers, using the event mesh network.

Figure 17:
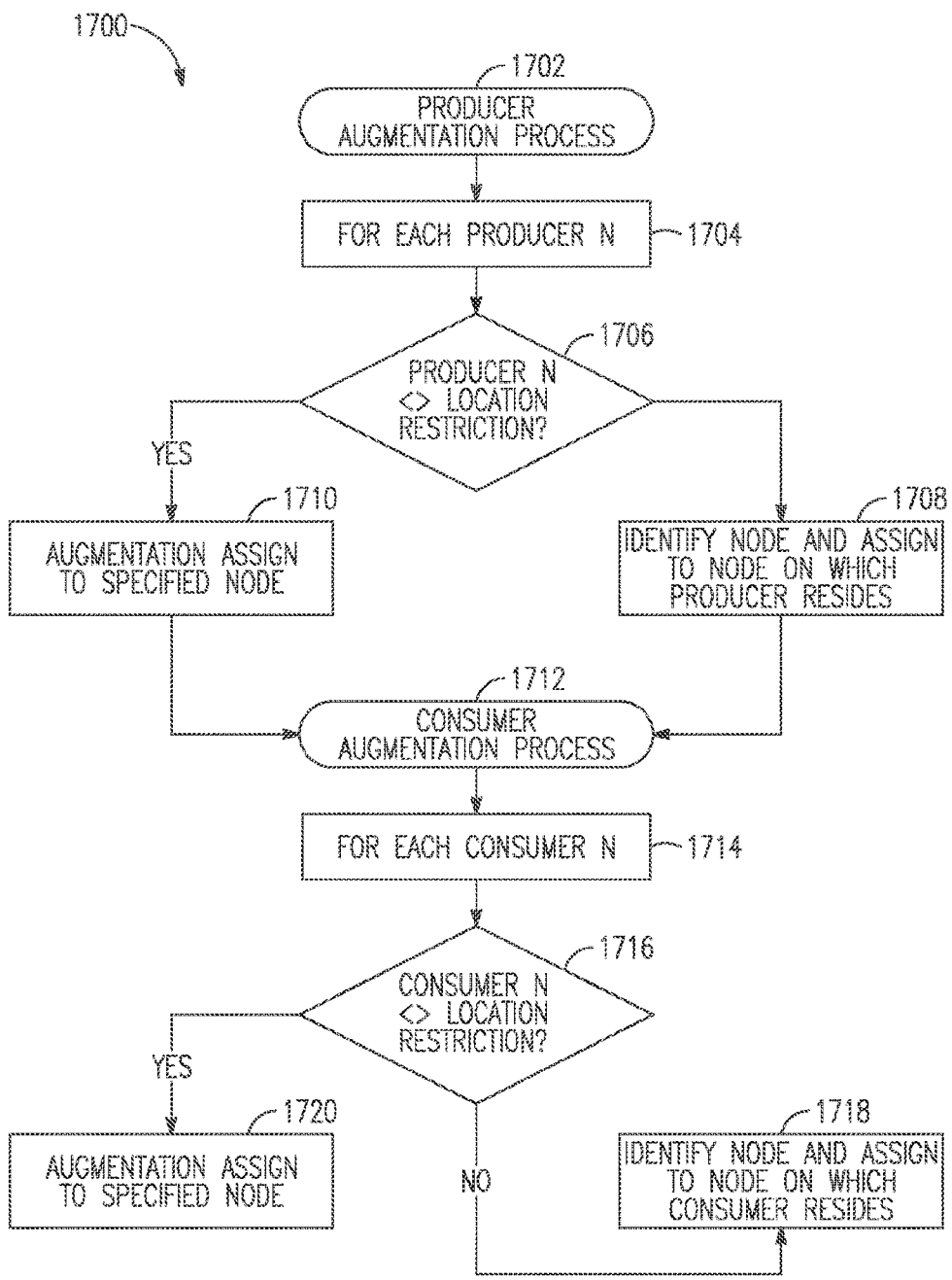
FIG. 17 illustrates a method 1700 in accordance with one embodiment.

Once a route has been identified, augmentations are assigned to nodes along the route (FIG. 17). A method 1700 assumes that all nodes can implement all augmentations unless the augmentation is annotated with a location dependency.

1. If the producer has augmentations that have location restrictions, the augmentation is assigned to the specified node.
2. If the producer has associated augmentations without location restrictions, they are identified and assigned to the node on which the producer resides.
3. If the subscriber has augmentations that have location restrictions, the augmentation is assigned to the specified node.
4. If the subscriber has associated augmentations, they are identified and assigned to the same node on which the subscriber resides.

Figure 18:
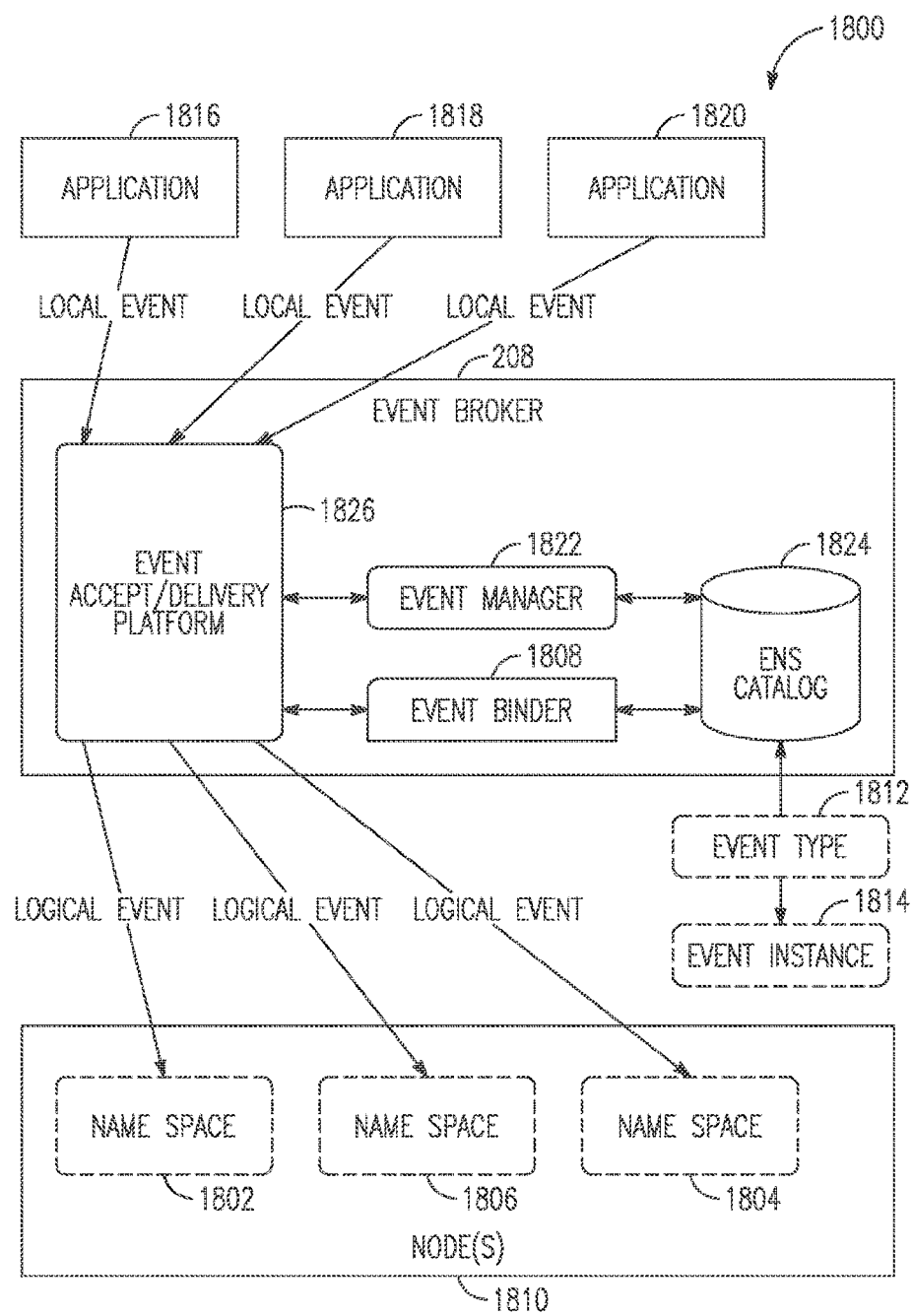
FIG. 18 illustrates an operation 1800 in accordance with one embodiment.

FIG. 18 is a diagrammatic representation showing further details regarding operations of the mesh event broker 1200, according to some example embodiments.

Figure 19:
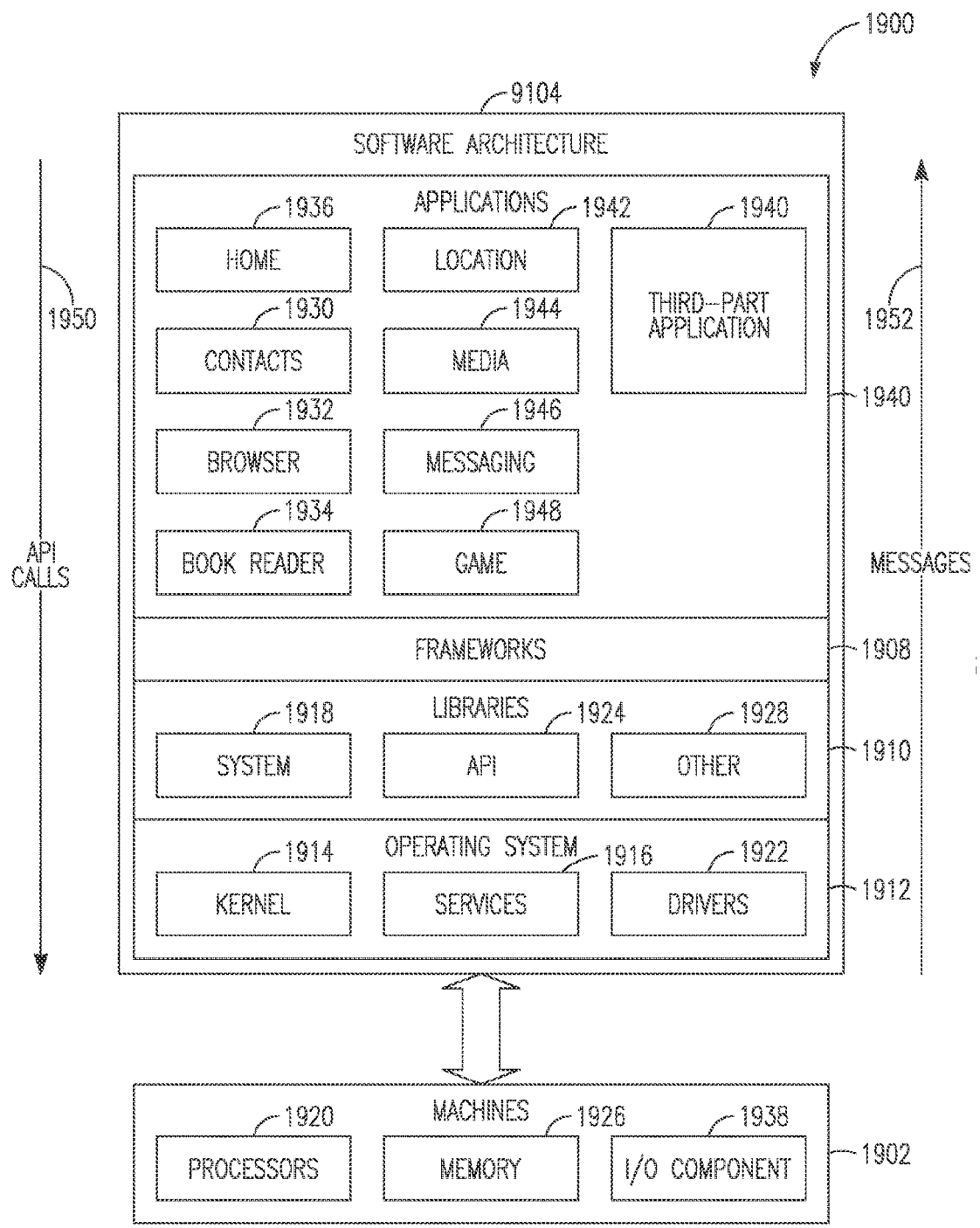
FIG. 19 is block diagram showing a software architecture within which the present disclosure may be implemented, in accordance with some example embodiments.

FIG. 19 is a block diagram 1900 illustrating a software architecture 1904, which can be installed on any one or more of the devices described herein. The software architecture 1904 is supported by hardware such as a machine 1902 that includes processors 1920, memory 1926, and I/O components 1938. In this example, the software architecture 1904 can be conceptualized as a stack of layers, where each layer provides a particular functionality. The software architecture 1904 includes layers such as an operating system 1912, libraries 1910, frameworks 1908, and applications 1906. Operationally, the applications 1906 invoke API calls 1950 through the software stack and receive messages 1952 in response to the API calls 1950.

The operating system 1912 manages hardware resources and provides common services. The operating system 1912 includes, for example, a kernel 1914, services 1916, and drivers 1922. The kernel 1914 acts as an abstraction layer between the hardware and the other software layers. For example, the kernel 1914 provides memory management, processor management (e.g., scheduling), component management, networking, and security settings, among other functionality. The services 1916 can provide other common services for the other software layers. The drivers 1922 are responsible for controlling or interfacing with the underlying hardware. For instance, the drivers 1922 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1910 provide a low-level common infrastructure used by the applications 1906. The libraries 1910 can include system libraries 1918 (e.g., C standard library) that provide functions such as memory allocation functions, string manipulation functions, mathematic functions, and the like. In addition, the libraries 1910 can include API libraries 1924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1910 can also include a wide variety of other libraries 1928 to provide many other APIs to the applications 1906.

The frameworks 1908 provide a high-level common infrastructure that is used by the applications 1906. For example, the frameworks 1908 provide various graphical user interface (GUI) functions, high-level resource management, and high-level location services. The frameworks 1908 can provide a broad spectrum of other APIs that can be used by the applications 1906, some of which may be specific to a particular operating system or platform.

In an example embodiment, the applications 1906 may include a home application 1936, a contacts application 1930, a browser application 1932, a book reader application 1934, a location application 1942, a media application 1944, a messaging application 1946, a game application 1948, and a broad assortment of other applications such as a third-party application 1940. The e applications 1906 are programs that execute functions defined in the programs. Various programming languages can be employed to create one or more of the applications 1906, structured in a variety of manners, such as object-oriented programming languages (e.g., Objective-C, Java, or C++) or procedural programming languages (e.g., C or assembly language). In a specific example, the third-party application 1940 (e.g., an application developed using the ANDROID™ or IOS™ software development kit (SDK) by an entity other than the vendor of the particular platform) may be mobile software running on a mobile operating system such as IOS™ ANDROID™, WINDOWS® Phone, or another mobile operating system. In this example, the third-party application 1940 can invoke the API calls 1950 provided by the operating system 1912 to facilitate functionality described herein.

Figure 20:
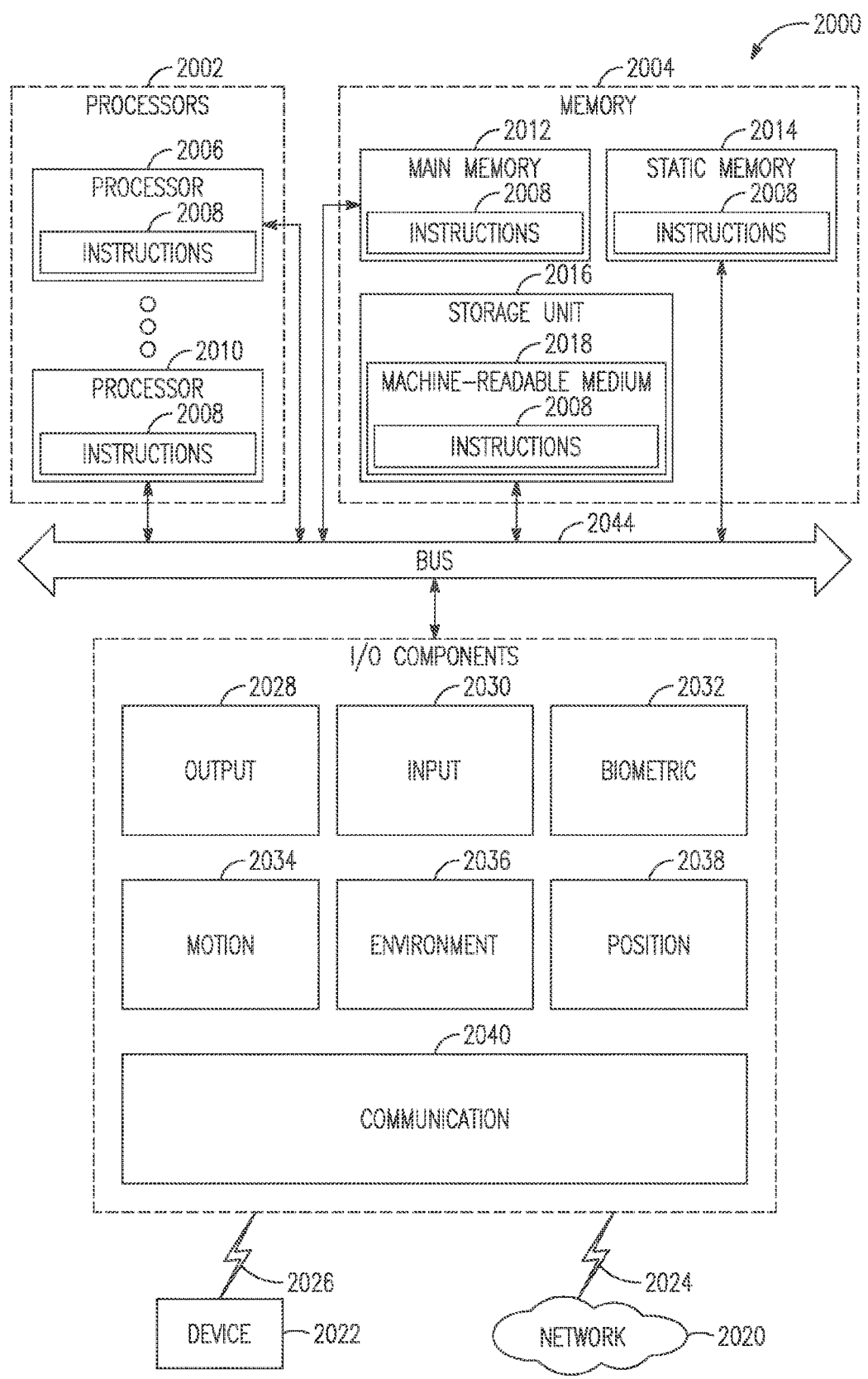
FIG. 20 is a diagrammatic representation of a machine in the form of a computer system within which a set of instructions may be executed for causing the machine to perform any one or more of the methodologies discussed herein, in accordance with some example embodiments.

FIG. 20 is a diagrammatic representation of the machine 2000 within which instructions 2008 (e.g., software, a program, an application, an applet, an app, or other executable code) for causing the machine 2000 to perform any one or more of the methodologies discussed herein may be executed. For example, the instructions 2008 may cause the machine 2000 to execute any one or more of the methods described herein. The instructions 2008 transform the general, non-programmed machine 2000 into a particular machine 2000 programmed to carry out the described and illustrated functions in the manner described. The machine 2000 may operate as a standalone device or may be coupled (e.g., networked) to other machines. In a networked deployment, the machine 2000 may operate in the capacity of a server machine or a client machine in a server-client network environment, or as a peer machine in a peer-to-peer (or distributed) network environment. The machine 2000 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2008, sequentially or otherwise, that specify actions to be taken by the machine 2000. Further, while only a single machine 2000 is illustrated, the term "machine" shall also be taken to include a collection of machines that individually or jointly execute the instructions 2008 to perform any one or more of the methodologies discussed herein.

The machine 2000 may include processors 2002, memory 2004, and I/O components 2042, which may be configured to communicate with each other via a bus 2044. In an example embodiment, the processors 2002 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 2006 and a processor 2010 that execute the instructions 2008. The term "processor" is intended to include multi-core processors that may comprise two or more independent processors (sometimes referred to as "cores") that may execute instructions contemporaneously. Although FIG. 20 shows multiple processors 2002, the machine 2000 may include a single processor with a single core, a single processor with multiple cores (e.g., a multi-core processor), multiple processors with a single core, multiple processors with multiples cores, or any combination thereof.

The memory 2004 includes a main memory 2012, a static memory 2014, and a storage unit 2016, both accessible to the processors 2002 via the bus 2044. The main memory 2004, the static memory 2014, and storage unit 2016 store the instructions 2008 embodying any one or more of the methodologies or functions described herein. The instructions 2008 may also reside, completely or partially, within the main memory 2012, within the static memory 2014, within machine-readable medium 2018 within the storage unit 2016, within at least one of the processors 2002 (e.g., within the processor's cache memory), or any suitable combination thereof, during execution thereof by the machine 2000.

The I/O components 2042 may include a wide variety of components to receive input, provide output, produce output, transmit information, exchange information, capture measurements, and so on. The specific I/O components 2042 that are included in a particular machine will depend on the type of machine. For example, portable machines such as mobile phones may include a touch input device or other such input mechanisms, while a headless server machine will likely not include such a touch input device. It will be appreciated that the I/O components 2042 may include many other components that are not shown in FIG. 20. In various example embodiments, the I/O components 2042 may include output components 2028 and input components 2030. The output components 2028 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2030 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 2042 may include biometric components 2032, motion components 2034, environmental components 2036, or position components 2038, among a wide array of other components. For example, the biometric components 2032 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 2034 include acceleration sensor components (e.g., accelerometer), gravitation sensor components, rotation sensor components (e.g., gyroscope), and so forth. The environmental components 2036 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 2038 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2042 further include communication components 2040 operable to couple the machine 2000 to a network 2020 or devices 2022 via a coupling 2024 and a coupling 2026, respectively. For example, the communication components 2040 may include a network interface component or another suitable device to interface with the network 2020. In further examples, the communication components 2040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2022 may be another machine or any of a wide variety of peripheral devices (e.g., a peripheral device coupled via a USB).

Moreover, the communication components 2040 may detect identifiers or include components operable to detect identifiers. For example, the communication components 2040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2040, such as location via Internet Protocol (IP) geolocation, location via Wi-Fi® signal triangulation, location via detecting an NFC beacon signal that may indicate a particular location, and so forth.

The various memories (e.g., memory 2004, main memory 2012, static memory 2014, and/or memory of the processors 2002) and/or storage unit 2016 may store one or more sets of instructions and data structures (e.g., software) embodying or used by any one or more of the methodologies or functions described herein. These instructions (e.g., the instructions 2008), when executed by processors 2002, cause various operations to implement the disclosed embodiments.

The instructions 2008 may be transmitted or received over the network 2020, using a transmission medium, via a network interface device (e.g., a network interface component included in the communication components 2040) and using any one of a number of well-known transfer protocols (e.g., hypertext transfer protocol (HTTP)). Similarly, the instructions 2008 may be transmitted or received using a transmission medium via the coupling 2026 (e.g., a peer-to-peer coupling) to the devices 2022.

Statements

1. A method to broker events of event-driven application components within a distributed computing environment using a mesh broker, the method comprising:

instantiating the mesh broker as a plurality of mesh agents, the plurality of mesh agents being provisioned to support mediation activities relating to a plurality of computational nodes within the distributed computing environment;

deploying the plurality of mesh agents as a mesh network among the plurality of computational nodes of the distributed computing environment;

maintaining a connectivity catalog storing cost data associated with transmission of an event notification between each of a plurality of pairs of computational nodes of the plurality of computational nodes; and using the plurality of mesh agents, automatically selecting routes across the mesh network, the automatic selecting comprising using the cost data to determine low-cost routes across the mesh network.

2. The method of statement 1, wherein the plurality of mesh agents is distributed as at least a partial mesh network among the plurality of computational nodes.

3. The method of statement any one or more of the preceding statements, wherein the mediation activities comprise at least one transformation, filtering, correlation, contextualization and analytics applied to events within the mesh network.

4. The method of any one or more of the preceding statements, wherein the deployment of the plurality of mesh agents among the plurality of computational nodes comprises selectively deploying the mediation activities performed by plurality of mesh agents to optimal ones of the plurality of computational nodes of the distributed computing environment.

5. A computing apparatus, the computing apparatus comprising:

a processor; and a memory storing instructions that, when executed by the processor, configure the apparatus to:

instantiating a mesh broker as a plurality of mesh agents, the plurality of mesh agents being provisioned to support mediation activities relate to a plurality of computational nodes within a distributed computing environment;

deploy the plurality of mesh agents as a mesh network among the plurality of computational nodes of the distributed computing environment;

maintain a connectivity catalog storing cost data associated with transmission of an event notification between each of a plurality of pairs of computational nodes of the plurality of computational nodes; and using the plurality of mesh agents, automatically select routes across the mesh network, the automatic selecting comprising using the cost data to determine low-cost routes across the mesh network.

6. The computing apparatus of any one or more of the preceding statements, wherein the plurality of mesh agents is distributed as at least a partial mesh network among the plurality of computational nodes.

7. The computing apparatus of any one or more of the preceding statements, wherein the mediation activities comprise at least one transformation, filter, correlation, contextualization and analytics applied to events within the mesh network.

8. The computing apparatus of any one or more of the preceding statements, wherein the deployment of the plurality of mesh agents among the plurality of computational nodes comprises selectively deploy the mediation activities performed by plurality of mesh agents to optimal ones of the plurality of computational nodes of the distributed computing environment.

9. A non-transitory computer-readable storage medium, the computer-readable storage medium including instructions that when executed by a computer, cause the computer to:

instantiating a mesh broker as a plurality of mesh agents, the plurality of mesh agents being provisioned to support mediation activities related to a plurality of computational nodes within a distributed computing environment;

deploy the plurality of mesh agents as a mesh network among the plurality of computational nodes of the distributed computing environment;

maintain a connectivity catalog storing cost data associated with transmission of an event notification between each of a plurality of pairs of computational nodes of the plurality of computational nodes; and using the plurality of mesh agents, automatically select routes across the mesh network, the automatic selecting comprising using the cost data to determine low-cost routes across the mesh network.

10. The computer-readable storage medium of any one or more of the preceding statements wherein the plurality of mesh agents is distributed as at least a partial mesh network among the plurality of computational nodes.

11. The computer-readable storage medium of any one or more of the preceding statements, wherein the mediation activities comprise at least one transformation, filter, correlation, contextualization and analytics applied to events within the mesh network.

12. The computer-readable storage medium of any one or more of the preceding statements, wherein the deployment of the plurality of mesh agents among the plurality of computational nodes comprises selectively deploy the mediation activities performed by plurality of mesh agents to optimal ones of the plurality of computational nodes of the distributed computing environment.

What is claimed is:

1. A method to distribute event processing in a distributed computing environment, the method comprising:

storing transmission costs between each of a plurality of pairs of computational nodes of a plurality of computational nodes in the distributed computing environment, the plurality of computational nodes comprising event producers and event consumers;

determining a low-cost route to deliver an event detected at an event producer to an event consumer based on the transmission costs;

applying, via the low-cost route, an augmentation to the event to generate an augmented event; and delivering, via the low-cost route, the augmented event to the event consumer.

2. The method of claim 1, wherein determining the low-cost route comprises:

determining a direct route between the event producer and the event consumer;

comparing a cost of the direct route to a threshold; and in response to the cost of the direct route transgressing the threshold, determining a route comprising a node intermediate to the event producer and the event consumer, a cost of the route being lower than the cost of the direct route, the cost of the route being based on transmission cost between the event producer and intermediate node and transmission cost between the intermediate node and the event consumer.

3. The method of claim 1, further comprising generating an event consumer cohort, the event consumer cohort comprising a first event consumer and a second event consumer, a transmission cost between the first event consumer and the second event consumer being below a threshold.

4. The method of claim 3, further comprising:
provisioning an event consolidator on a node of the plurality of computational nodes with a lowest total transmission cost to the event consumer cohort, total transmission costs to be computed based on transmission costs between the node and each of the event consumers in the event consumer cohort; and
configuring the event consolidator to receive the event from the event producer and deliver the event to members of the event consumer cohort.

5. The method of claim 1, further comprising instantiating a plurality of mesh agents that are provisioned to support applying the augmentation to the event using the plurality of computational nodes within the distributed computing environment.

6. The method of claim 5, further comprising deploying the plurality of mesh agents as a full mesh network or a partial mesh network among the plurality of computational nodes.

7. The method of claim 1, wherein the distributed computing environment comprises a plurality of networks and the method further comprises identifying the low-cost route across the plurality of networks.

8. The method of claim 1, wherein the augmentation comprises at least one transformation, filtering, correlation, contextualization or analytics operation.

9. The method of claim 1, wherein:
the event is associated with a unique identifier, at least one event producer of the event, and at least one event consumer of the event; and
the event producers and the event consumers are associated with locations corresponding to computational nodes of the plurality of computational nodes.

10. The method of claim 9, wherein the method further stores event consolidator information with respect to the event producers and the event consumers.

11. The method of claim 8, wherein the augmentation has a location dependency, the location dependency restricting the augmentation to a respective specified node of the plurality of computational nodes.

12. The method of claim 6, wherein the deploying of the plurality of mesh agents comprises using augmentation provisioning rules to determine locations corresponding to computational nodes for selected mesh agents of the plurality of mesh agents within the full mesh network or the partial mesh network to perform augmentations of events.

13. The method of claim 12, wherein the augmentations are performed based on rule sets, and the use of the augmentation provisioning rules comprises provisioning the rule sets to the determined locations for the selected mesh agents of the plurality of mesh agents.

14. The method of claim 13, further comprising routing of events within the distributed computing environment based on the rule sets.

15. The method of claim 13, comprising creating configuration data for each of the plurality of computational nodes, the configuration data containing a specific rule set of the rule sets to be provisioned to a specific node.

16. The method of claim 1, wherein applying the augmentation to the event comprises:
determining the augmentation is associated with the event producer and that the augmentation has no location restrictions; and
assigning the augmentation to a node of the plurality of computational nodes corresponding to a location of the event producer.

17. The method of claim 1, wherein applying the augmentation to the event comprises:
determining the augmentation is associated with the event consumer and that the augmentation has no location restrictions; and
assigning the augmentation to a node of the plurality of computational nodes corresponding to a location of the event consumer.

18. The method of claim 1, wherein applying the augmentation to the event comprises:
determining that the augmentation has a location restriction indicating a restriction on applying the augmentation; and
selecting a node along the low-cost route for applying the augmentation to the event based on determining that the node satisfies the restriction.

19. A system comprising:
one or more processors; and
a non-transitory computer readable storage medium comprising instructions that when executed by the one or more processors cause the one or more processors to perform operations comprising:
storing transmission costs between each of a plurality of pairs of computational nodes of a plurality of computational nodes in a distributed computing environment, the plurality of computational nodes comprising event producers and event consumers;
determining a low-cost route to deliver an event detected at an event producer to an event consumer based on the transmission costs;
applying, via the low-cost route, an augmentation to the event to generate an augmented event; and
delivering, via the low-cost route, the augmented event to the event consumer.

20. A machine-readable non-transitory storage medium having instruction data executable by a machine to cause the machine to perform operations comprising:
storing transmission costs between each of a plurality of pairs of computational nodes of a plurality of computational nodes in a distributed computing environment, the plurality of computational nodes comprising event producers and event consumers;
determining a low-cost route to deliver an event detected at an event producer to an event consumer based on the transmission costs;
applying, via the low-cost route, an augmentation to the event to generate an augmented event; and
delivering, via the low-cost route, the augmented event to the event consumer.

\* \* \* \* \*